United States Patent
Lee et al.

(10) Patent No.: US 9,867,095 B2
(45) Date of Patent: Jan. 9, 2018

(54) METHOD FOR SWITCHING DATA BETWEEN PLURALITY OF COMMUNICATIONS SYSTEMS AND APPARATUS THEREFOR

(71) Applicant: LG ELECTRONICS INC., Seoul (KR)

(72) Inventors: Eunjong Lee, Seoul (KR); Hyeyoung Choi, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 14/778,552

(22) PCT Filed: Mar. 4, 2014

(86) PCT No.: PCT/KR2014/001758
§ 371 (c)(1),
(2) Date: Sep. 18, 2015

(87) PCT Pub. No.: WO2014/148749
PCT Pub. Date: Sep. 25, 2014

(65) Prior Publication Data
US 2016/0295473 A1    Oct. 6, 2016

Related U.S. Application Data

(60) Provisional application No. 61/803,806, filed on Mar. 21, 2013.

(51) Int. Cl.
*H04W 36/02* (2009.01)
*H04W 76/04* (2009.01)
(Continued)

(52) U.S. Cl.
CPC ..... *H04W 36/023* (2013.01); *H04W 36/0022* (2013.01); *H04W 36/0033* (2013.01); *H04W 76/046* (2013.01); *H04W 36/14* (2013.01)

(58) Field of Classification Search
CPC .......... H04W 36/023; H04W 36/0033; H04W 36/0022; H04W 76/046; H04W 36/14
See application file for complete search history.

(56) References Cited

U.S. PATENT DOCUMENTS

2013/0070596 A1* 3/2013 Yeh .................... H04W 36/0038
                                                                370/235
2015/0358876 A1* 12/2015 Liang .................... H04W 36/14
                                                                370/331

FOREIGN PATENT DOCUMENTS

CN   201310011995.7   *  1/2013   ............ H04W 36/14
KR   10-2010-0021643    2/2010
(Continued)

OTHER PUBLICATIONS

3rd Generation Partnership Project; Technical Specification Group Services and System Aspects; Architecture enhancements for non-3GPP accesses (Release 10), 3GPP TS 23.402 V10.7.0 (Mar. 2012).*
(Continued)

*Primary Examiner* — Mohammad Adhami
*Assistant Examiner* — Shailendra Kumar
(74) *Attorney, Agent, or Firm* — Lee Hong Degerman Kang Waimey

(57) ABSTRACT

A method for switching data between a plurality of communications systems according to the present invention is characterized by including the steps of: receiving a message from a first communications system having generated at least one data radio bearer (DRB) with a terminal for switching data to a second communications system; switching data to the second communications system based on the (Continued)

message; and carrying out data communication with the base station of the second communications system after switching data, wherein the message contains the information of all DRBs generated in the terminal or the information for indicating whether to keep the information of at least a particular one of the DRBs generated in the terminal, and the data switching operation is performed according to the information.

6 Claims, 21 Drawing Sheets

(51) Int. Cl.
*H04W 36/00* (2009.01)
*H04W 36/14* (2009.01)

(56) References Cited

FOREIGN PATENT DOCUMENTS

| KR | 10-2012-0071997 | 7/2012 |
|---|---|---|
| WO | 2012/164363 | 12/2012 |

OTHER PUBLICATIONS

PCT International Application No. PCT/KR2014/001758, Written Opinion of the International Searching Authority dated Jun. 26, 2014, 14 pages.

* cited by examiner

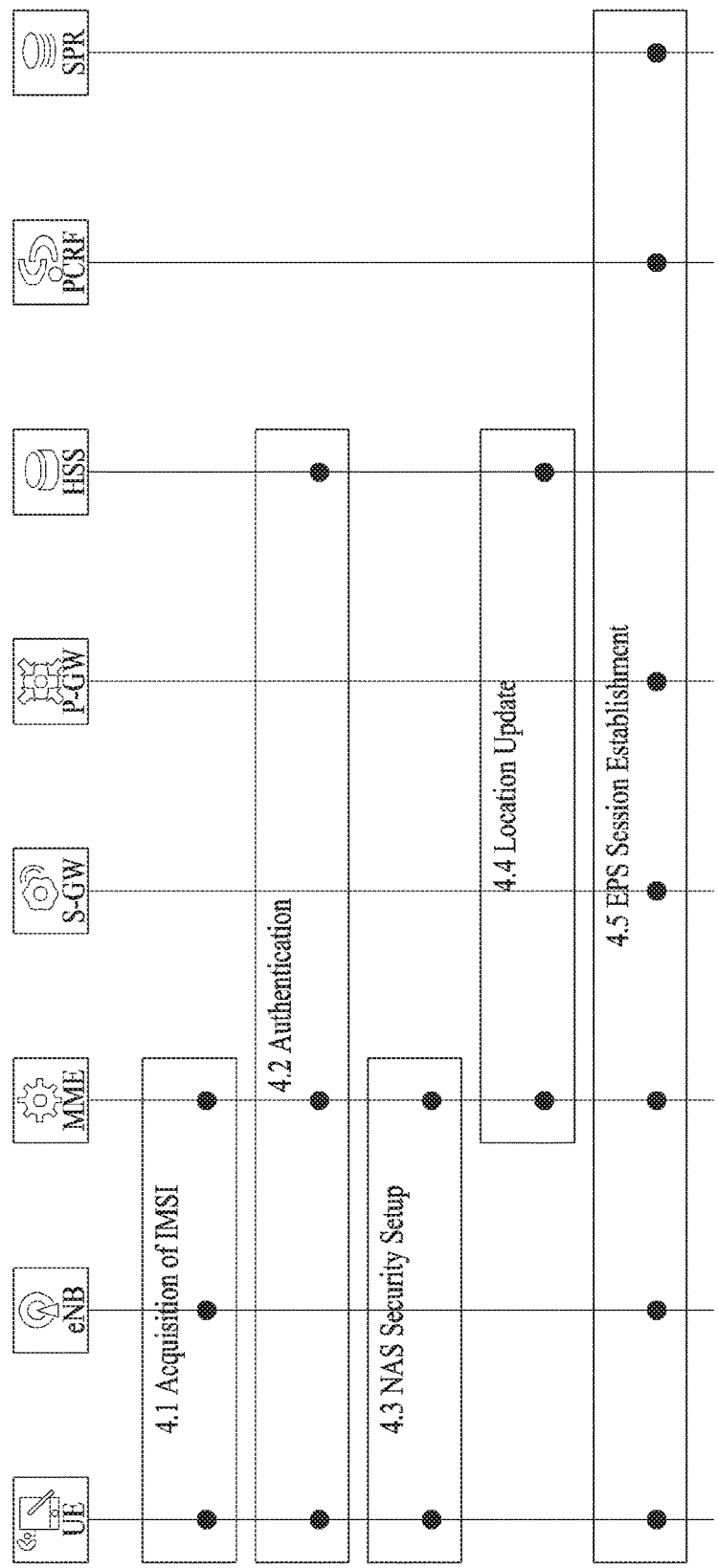

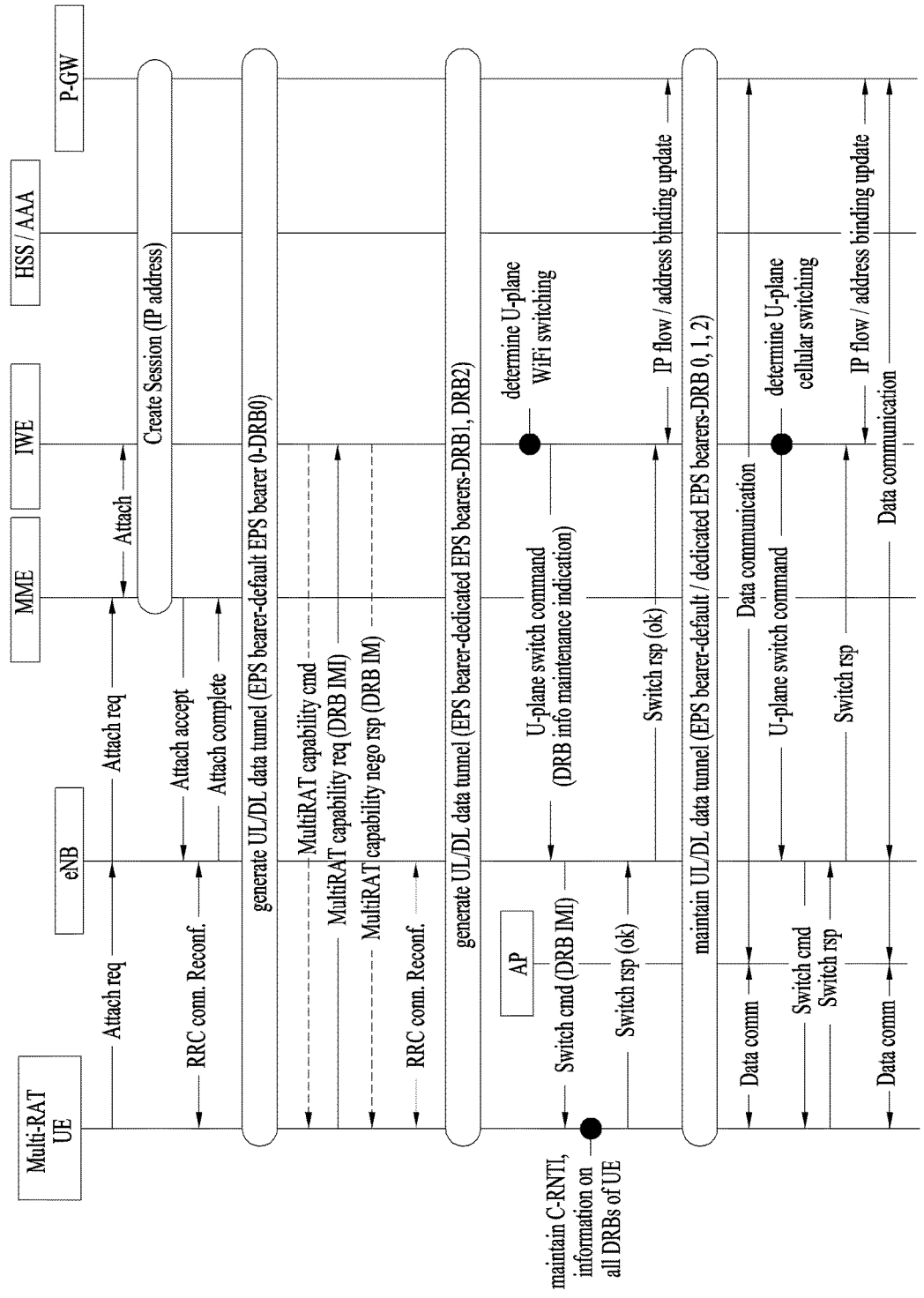

METHOD FOR SWITCHING DATA BETWEEN PLURALITY OF COMMUNICATIONS SYSTEMS AND APPARATUS THEREFOR

CROSS-REFERENCE TO RELATED APPLICATIONS

This application is the National Stage filing under 35 U.S.C. 371 of International Application No. PCT/KR2014/001758, filed on Mar. 4, 2014, which claims the benefit of U.S. Provisional Application No. 61/803,806, filed on Mar. 21, 2013, the contents of which are all hereby incorporated by reference herein in their entirety.

TECHNICAL FIELD

The present invention relates to a wireless communication, and more particularly, to a method of performing data switching among a plurality of communication systems and an apparatus therefor.

BACKGROUND ART

In a wireless communication system, there may be multi-RAT user equipment (UE) with capability for access to two or more radio access technologies (RATs). In order to access specific RAT, connection is established to specific RAT and data is transmitted and received based on UE request. However, even if the multi-RAT UE has capability of accessing two or more RATs, the multi-RAT UE cannot simultaneously access multiple RATs. That is, currently, even if a UE has multi-RAT capability, the UE cannot simultaneously transmit and receive data through different RATs.

Since it is not necessary for a legacy multi-RAT technology to have interworking between a wireless LAN and a cellular network, there is a problem in that overall system efficiency is low. Moreover, although a UE has capability of accessing multiple RATs at the same time, it is able to access multiple RATs at the same time in a manner of supporting flow mobility/IP-flow mapping in a network level only without a control in a radio level. For this reason, a legacy technology does not request any control connection between an AP and a cellular network and has been in progress based on a request of a user equipment.

Yet, since the legacy technology is unable to identify a precise situation of a network and selects a UE-oriented RAT, there exists a limit for enhancing overall network efficiency. In particular, since a UE is capable of accessing a plurality of communication systems, it is necessary to have methods for performing data switching from a specific communication system to a different communication system. However, a study on the methods has not been performed yet.

DISCLOSURE OF THE INVENTION

Technical Tasks

One technical task of the present invention is to provide a method for a user equipment to perform data switching among a plurality of communication systems.

Another technical task of the present invention is to provide a user equipment configured to perform data switching among a plurality of communication systems.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of performing data switching among a plurality of communication systems, which is performed by a user equipment, includes receiving a message for commanding data switching to a second communication system from a base station of a first communication system, at least one data radio bearers (DRB) is generated between the base station of the first communication system and the user equipment, performing an operation of the data switching to the second communication system based on the message, and performing data communication with a base station of the second communication system after the operation of the data switching is performed. In this case, the message includes information on all DRBs generated in the user equipment or information indicating whether to maintain information on a specific DRB among at least one DRB generated in the user equipment and performing the operation of the data switching to the second communication system is performed according to the information.

If the information indicates to maintain the information on all DRBs generated in the user equipment, the user equipment performs the data switching to the second communication system while maintaining the information on all DRBs and the user equipment maintains at least a C-RNTI (cell radio network temporary identifier), a DRB (data radio bearer) ID, AS security info, or an ECGI (E-UTRAN cell global identifier). If the information indicates to maintain the information on the specific DRB among the at least one DRB generated in the user equipment, the user equipment performs the data switching to the second communication system while maintaining the indicated information on the specific DRB only. The at least one DRB generated in the user equipment include a default DRB or a dedicated DRB. If the data switching is performed between a plurality of the communication systems, the method further includes negotiating with an entity of the first communication system whether to use a DRB information maintenance indication function. If it is determined to use the DRB information maintenance indication function, the message may include the information on all DRBs generated in the user equipment or the information indicating whether to maintain the information on the specific DRB among at least one DRB generated in the user equipment. The first communication system may correspond to a cellular communication system and the second communication system may correspond to a wireless LAN communication system. The entity of the first communication system may correspond to a base station, an MME (mobility management entity), or an entity (interworking entity, IWE) managing interworking among a plurality of communication systems. The method may further include receiving a message for commanding data switching to the first communication system from the base station of the first communication system while performing data communication with the base station of the second communication system and performing the data switching to the first communication system without performing radio resource control (RRC) connection establishment or RRC reconnection establishment with the base station of the first communication system based on the message for commanding the data switching to the first communication system.

To further achieve these and other advantages and in accordance with the purpose of the present invention, according to a different embodiment, a user equipment for performing data switching between a plurality of communication systems includes a receiver configured to receive a message for commanding data switching to a second communication system from a base station of a first communication system, at least one data radio bearer (DRB) with the user equipment and a processor configured to control to perform an operation of the data switching to the second communication system based on the message and perform data communication with a base station of the second communication system after the operation of the data switching is performed. In this case, the message includes information on all DRBs generated in the user equipment or information indicating whether to maintain information on a specific DRB among at least one DRB generated in the user equipment and the processor is further configured to control to perform the operation of the data switching to the second communication system according to the information.

The receiver is further configured to receive a message for commanding data switching to the first communication system from the base station of the first communication system while performing data communication with the base station of the second communication system and the processor is configured to perform the data switching to the first communication system without performing radio resource control (RRC) connection establishment or RRC reconnection establishment with the base station of the first communication system based on the message for commanding the data switching to the first communication system. If data switching is performed between a plurality of the communication systems, the processor is configured to negotiate with an entity of the first communication system whether to use a DRB information maintenance indication function and if it is determined to use the DRB information maintenance indication function as a result of the negotiation, the message received by the receiver may include the information on all DRBs generated in the user equipment or the information indicating whether to maintain the information on the specific DRB among at least one DRB generated in the user equipment.

Advantageous Effects

According to embodiments of the present invention, in order for a user equipment to efficiently use a wireless LAN (WLAN) via a control of a cellular network in a wideband wireless communication system, it is able to seamlessly and promptly switch connection of data mobility capable of being occurred between an AP and a cellular network.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 4b is a simple diagram for explaining an initial access procedure of a user equipment in LTE system;

FIG. 17 is an exemplary diagram for explaining Multi-RAT capability negotiation for indicating DRB information maintenance and data (U-plane, DRB, flow) switch procedure using a case of U-plane switching.

BEST MODE

Mode for Invention

Figure 1:
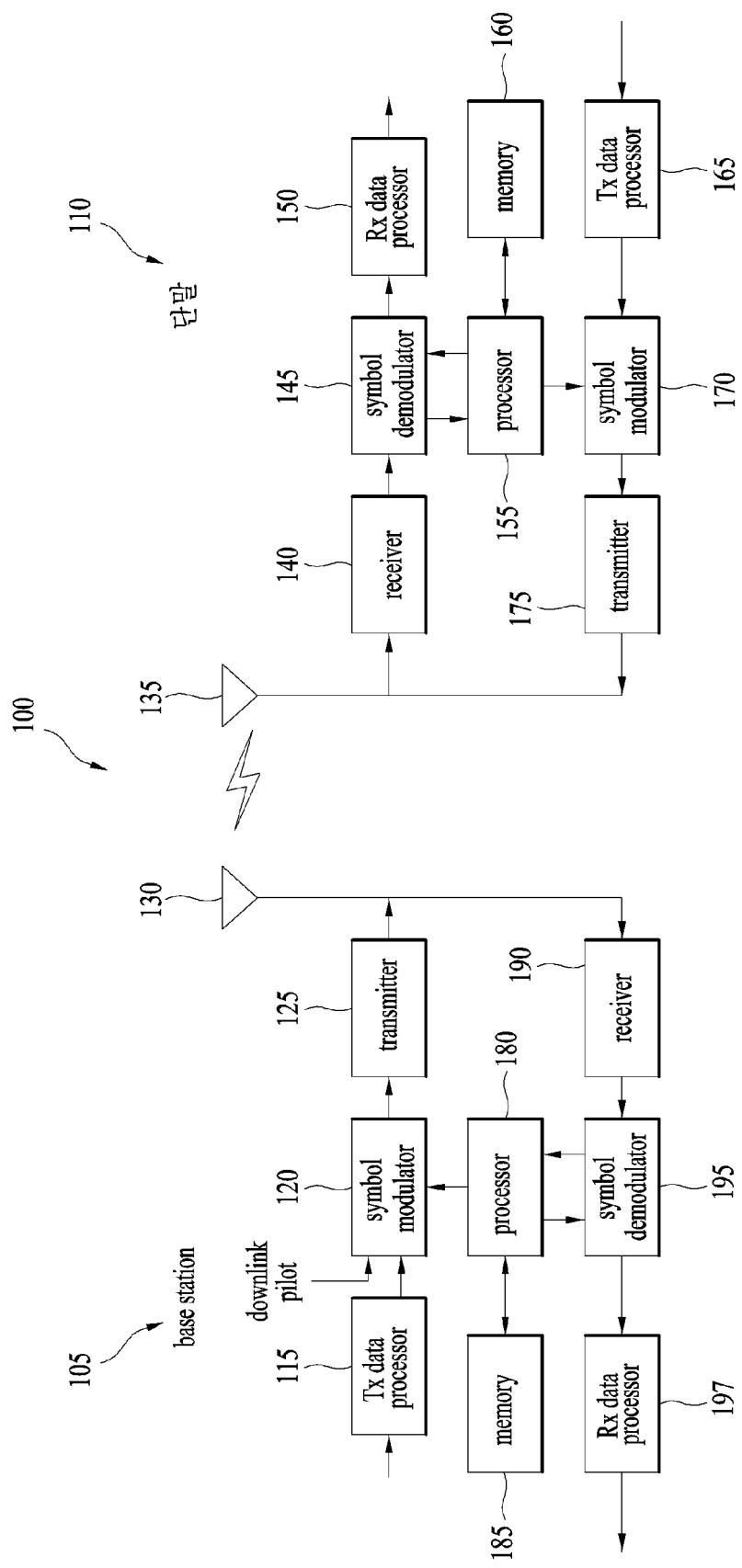
FIG. 1 is a block diagram for a configuration of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or may be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology may be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 may be regarded as performing a series of operations such as a data processing and the like except a function of receiving or transmitting a signal without being specially mentioned.

Figure 2:
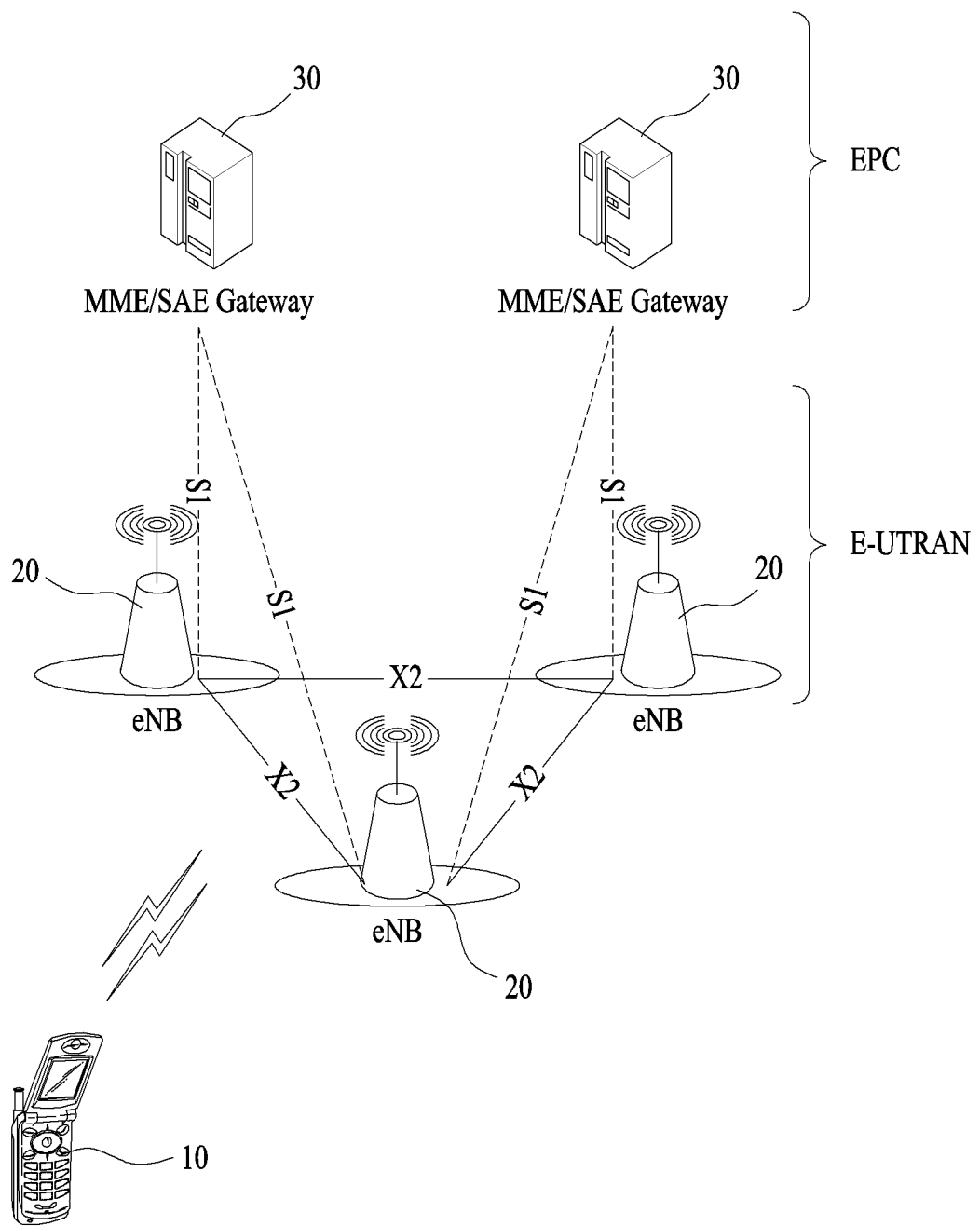
FIG. 2 is a diagram for an example of a network structure for E-UMTS (Evolved Universal Mobile Telecommunications System)

FIG. 2 is a diagram illustrating a structure of a network of an evolved universal mobile telecommunications system (E-UMTS).

The E-UMTS may also be referred to as an LTE system. The system may be broadly arranged in order to provide various communication services such as voice ALV packet data and in general, may be configured to be enabled based on various technologies that will be described and disclosed in detail with reference to the following diagrams.

Referring to FIG. 2, the E-UMTS network includes an evolved UMTS terrestrial radio access network (E-UTRAN), an evolved packet core (EPC), and one or more UEs 10. The E-UTRAN includes one or more BSs 20. With regard to the EPC, an MME/SAE gateway 30 provides an end point of a session and a mobility control function to the UE 10. The BS 20 and the MME/SAE gateway 30 may be connected through an S1 interface.

The UE 10 may be an apparatus brought by a user and may also be referred to as a mobile station (MS), a user terminal (UT), a subscriber station (SS), or a wireless apparatus.

In general, the BS 20 is a fixed station that communicates with the UE 10. The BS 20 may also be referred to as an access point (AP) as well as a base station. A BS provides end points of a user plane and a control plane to a UE. In general, the BS is configured to include a transmitter and a processor among other components and to be operated according to various technologies stated in the specification.

A plurality of UEs 10 may be positioned in one cell. In general, one BS 20 is arranged in each cell. An interface for transmission of user traffic or control traffic may be used between the BSs 20. In this specification, "downlink" refers to communication to the UE 10 from the BS 20 and "uplink" refers to communication to the BS 20 from the UE 10.

The MME/SAE gateway 30 provides various functions including distribution of paging messages, security control, idle state mobility control, SAR bearer control, and ciphering and integrity protection of non-access stratum (NAS) signaling to the BSs 20. The SAE gateway 30 provides various functions including termination of U-plan packets for paging reasons and switching of U-plan for supporting UE mobility. For convenience of description, the MME/SAE gateway 30 may also be referred to as a "gateway" in the specification. However, this structure may be interpreted as including both an MME gateway and a SAE gateway.

A plurality of nodes may be connected between the BS 20 and the gateway 30 through an S1 interface. The BSs 20 may be connected to each other through an X2 interface and neighbor BSs may have a meshed network structure with an X2 interface.

Figure 3A:
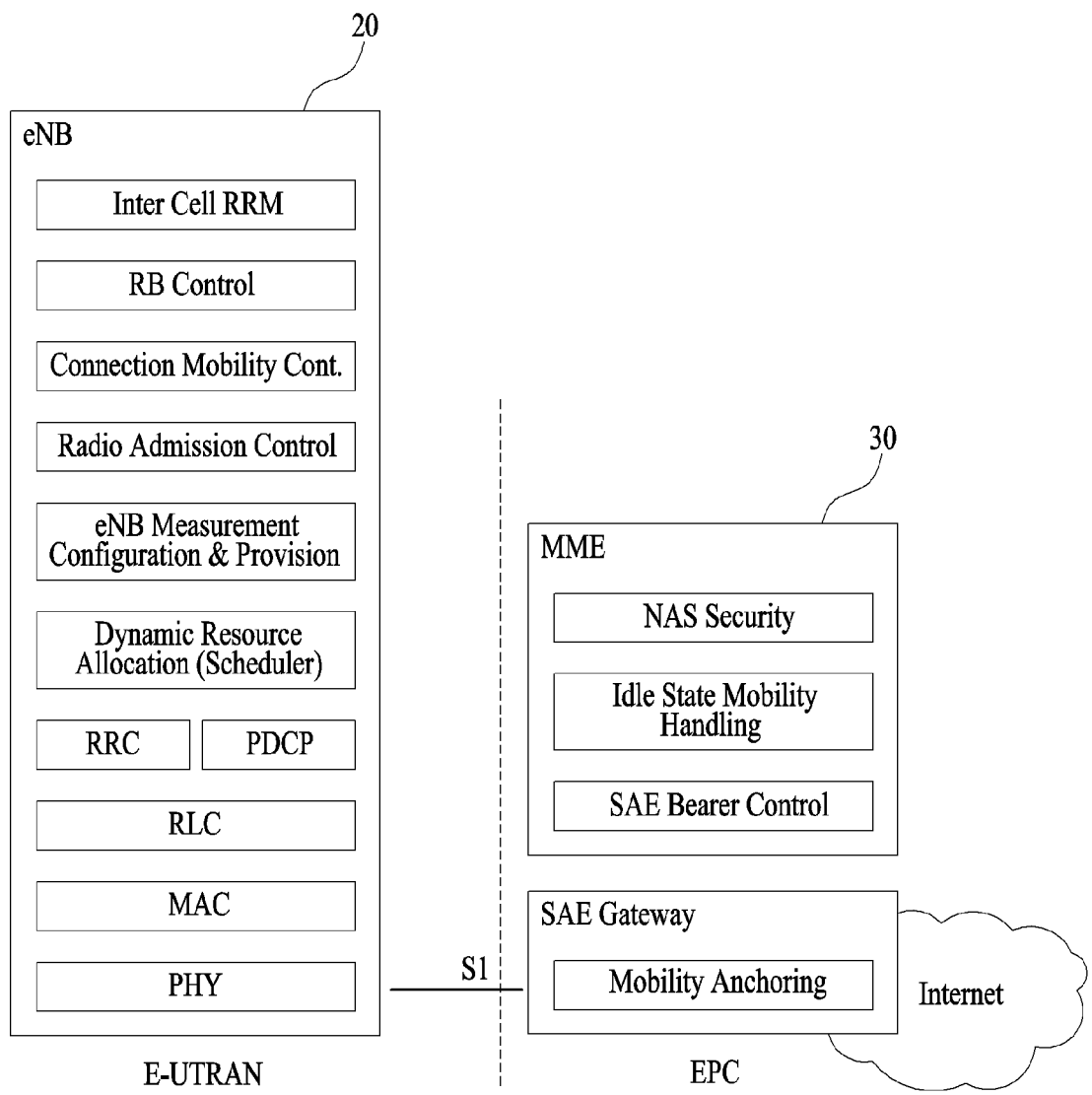
FIG. 3a is a block diagram for a general structure of general E-UTRAN and general EPC.

FIG. 3A is a block diagram illustrating general structures of general E-UTRAN and general EPC.

Referring to FIG. 3A, the BS 20 may perform functions of selection for the gateway 30, routing toward a gateway while radio resource control (RRC) is enabled, scheduling and transmission of paging messages, scheduling and transmission of broadcasting channel (BCCH) information, dynamic allocation of a resource to the UEs 10 in downlink and uplink, configuration and provisioning of BS measurements, wireless bearer control, radio admission control (RAC), and connection mobility control in an LTE_ACTIVE state.

As described above, in the EPC, the gateway 30 may perform functions of paging origination, LTE_IDLE state control, ciphering of a user plane, SAE barer control, and integrity protection of non-access stratum (NAS) signaling.

Figure 3B:
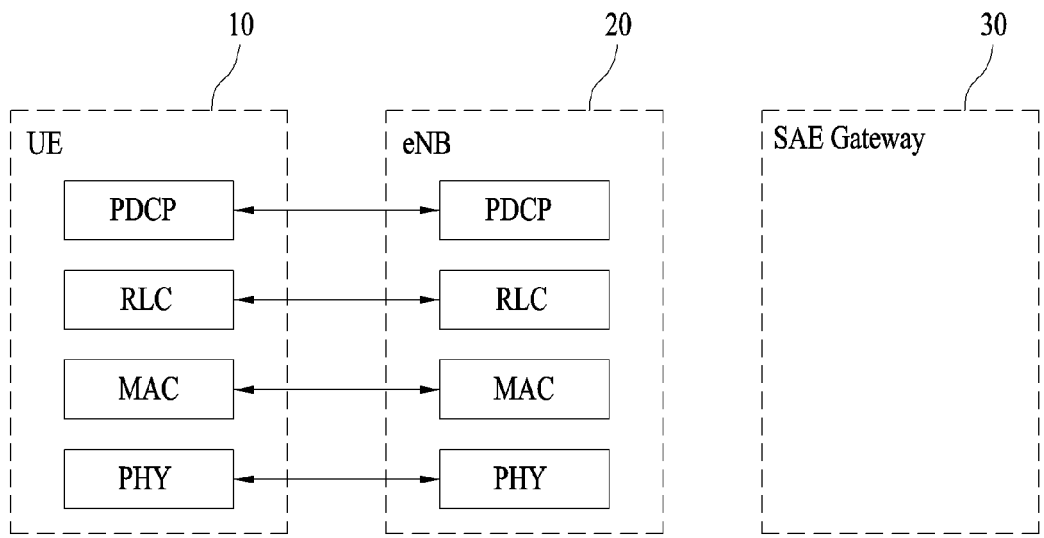
FIGS. 3b and 3c are block diagrams for a user plane protocol and a control plane protocol for E-UMTS network.
Figure 3C:
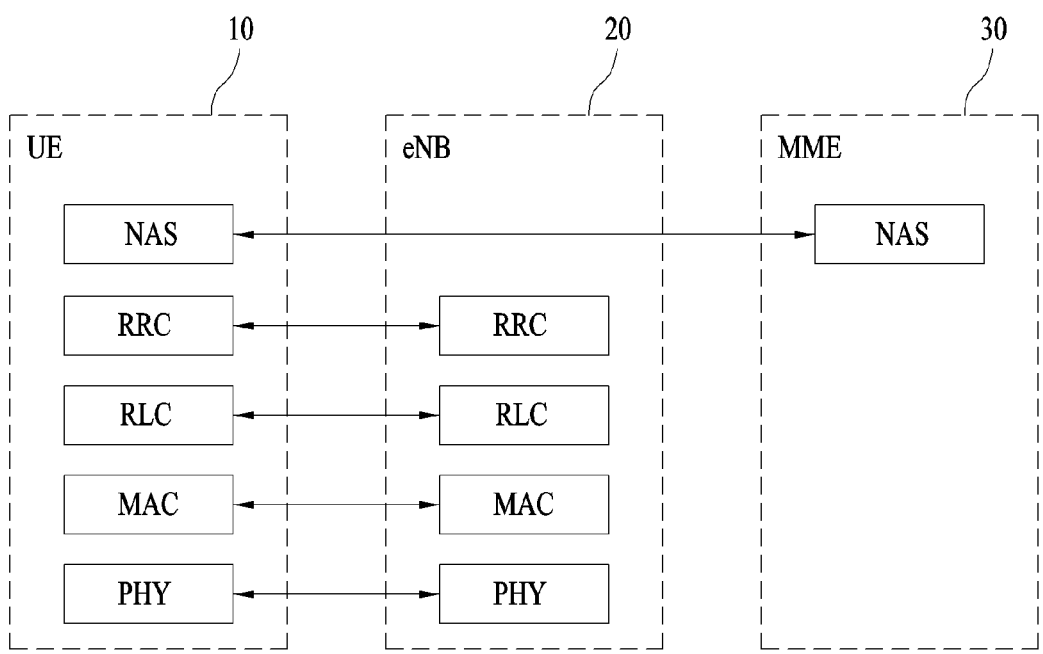

FIGS. 3B and 3C are block diagrams illustrating user plane protocol and control plane protocol stack for an E-UMTS network.

Referring to FIGS. 3B and 3C, protocol layers may be classified into a first layer L1, a second layer L2, and a third layer L3 based on three lower layers of an open system interconnection (OSI) standard model.

The first layer L1 (or a physical layer (PHY)) provides an information transfer service to a higher layer using a physical channel. The PHY is linked to a medium access control (MAC) layer positioned in a higher layer through a transport channel. Data between the MAC layer and the PHY is transmitted through the transport channel. Data between different PHYs, i.e., between PHYs of a transmitter and a receiver (e.g., between PHYs of the UE 10 and the BS 20) is transmitted through a physical channel 21.

The MAC layer of the second layer L2 provides a service to a radio link control (RLC) layer corresponding to a higher layer through a logical channel. The MAC layer of the second layer L2 supports reliable data transmission. The RLC layer illustrated in FIGS. 3B and 3C is illustrated as the RLC layer is not necessary when MAC RLC functions are implemented and are performed in the MAC layer. Referring to FIG. 3B, a packet data convergence protocol (PDCP) layer of the second layer L2 performs a header compression function of reducing unnecessary control information to efficiently transmit an IP packet such as IPv4 or IPv6 in a radio interface having a narrow bandwidth.

Referring to FIG. 3C, an RRC layer of the third layer L3 corresponding to the lowest of three layers is defined only in the control plane. The RRC layer controls logical channels, transport channels and physical channels with respect to configuration, reconfiguration and release of radio bearers (RBs). Here, RBs refers to a service provided by the second layer L2 for data transmission between a UE and an E-UTRAN.

Referring to FIG. 3B, the RLC and MAC layers (which are terminated in the BS 20 in a network) perform functions such as scheduling, automatic repeat request (ARQ), and hybrid automatic repeat request (HARQ). The PDCP layer (which is terminated in the BS 20 in a network) may perform a user plane function such as header compression, integrity protection, and ciphering.

Referring to FIG. 3C, the RLC and MAC layers (which are terminated in the BS 20 in a network) perform the same functions as in a control plane. As exemplified above, the RRC layer (which is terminated in the BS 20 in a network) may perform functions such as broadcasting, paging, RRC connection control, radio bearer (RB) control, mobility function, and UE measurement report and control. A NAS control protocol terminated in the MME gateway 30 in a network may perform a function such as SAE bearer control, authentication, LTE_IDLE mobility handling, paging start in LTE_IDLE, and security control for signaling between gateways and the UE 10.

The NAS control protocol may user three different states: first, LTE_DETACHED state in which there is no RRC entity, second, LTE_IDLE state in which there is no RRC connection but minimum UE information is stored, and third, LTE_ACTIVE state in which RRC connection is established.

The RRC state may be classified into two different states such as RRC_IDLE and RRC_CONNECTED. In the RRC_IDLE state, the UE 10 may receive broadcasting of paging information and system information, specifies discontinuous reception (DRX) configured with NAS, and is allocated with an identifier (ID) for uniquely identifying the UE 10 in a tracking region. In addition, in the RRC_IDLE state, there is no context stored in the BS 20.

In the RRC_IDLE state, the UE 10 specifies a paging DRX cycle. In particular, the UE 10 monitors a paging signal in the case of specific paging of each UE-specific paging DRX cycle.

In the RRC_CONNECTED state, the UE 10 includes E-UTRAN RRC connection and context in the E-UTRAN and transmits and/or receives data to/from an available network (BS). In addition, the UE 10 may report channel quality information and feedback information to the BS 20.

In the RRC_CONNECTED state, the E-UTRAN knows a cell to which the UE 10 belongs. Accordingly, a network may transmit/receive data to/from the UE 10, control mobility (handover) of the UE 10, and perform cell measurement on a neighbor cell.

Figure 4A:
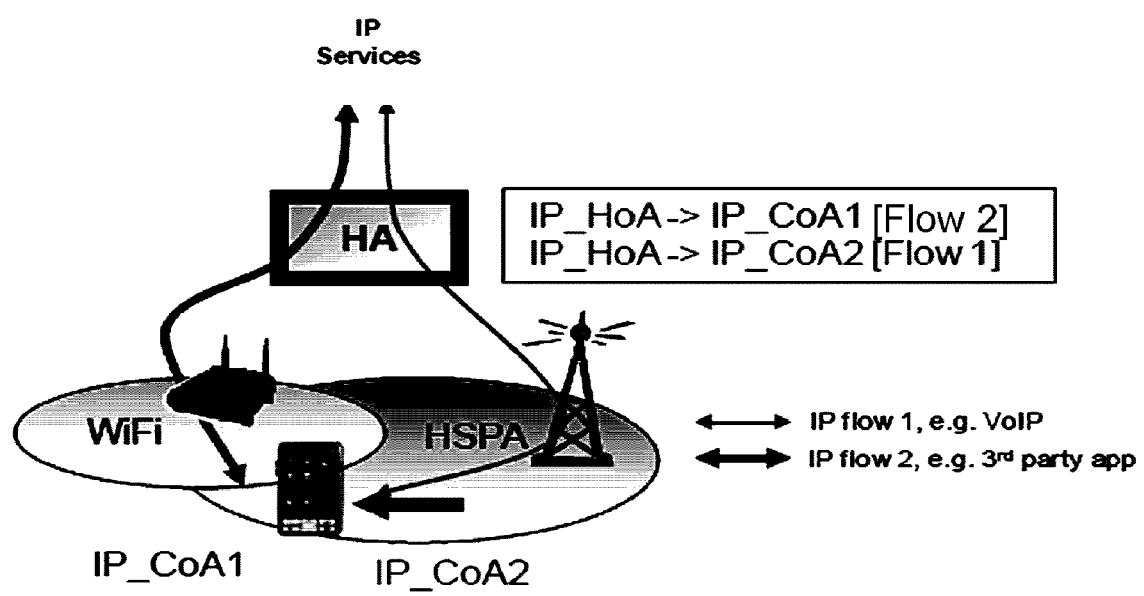
FIG. 4a is an exemplary diagram for explaining IP flow-based Wi-Fi mobility.

FIG. 4*a* is an exemplary diagram for explaining IP flow-based Wi-Fi mobility.

IFOM (IP Flow Mobility)

3GPP (Rel-10) standard describes 3G/WiFi Seamless Offload including a WLAN offloading technology in a DSMIPv6-based IP flow unit, a DSMIPv6 (dual stack mobile Iv6) UE and a solution supporting IPv4 and IPv6 at the same time in a network. As a mobile communication network is diversified, IPv6 adoption is extended and mobility support is magnified as a core technology. Hence, mobility support is also required by a legacy IPv4 network and the legacy IPv4 network also adopts DSMIPv6. And, a client-based MIP technology is provided to enable a user to detect a movement of the user equipment and inform an agent of the movement of the user equipment. An HA corresponds to an agent managing mobility of a mobile node. There exist a flow binding table and a binding cache table. In case of using PMIPv6, due to a technical problem having difficulty in managing in an IP flow unit, IFOM uses DSMIPv6 only.

MAPCON (Multi Access PDN Connectivity)

This technology corresponds to a technology having multiple PDN connectivity with APNs different from each other at the same time and a protocol independent technology. This technology may use PMIPv6, GTP and DSMIPv6. All of data flows, which used to be transmitted via a single PDN, move using the technology.

FIG. 4*b* is a simple diagram for explaining an initial access procedure of a user equipment in LTE system.

FIG. 4*b* shows a flow of an LTE initial attach (initial access) procedure centering on a representative message and a parameter and shows a part of 3GPP standard call flow only. As shown in FIG. 4*b*, the LTE initial attach procedure may be mainly classified into 5 steps.

1. Acquisition of IMSI: A step for an LTE network (MME) to acquire an IMSI value of a UE (UE ID acquisition step)

2. Authentication: A step for a UE to authenticate LTE network and the step for the LTE network (MME) to authenticate the UE (user authentication step)

3. NAS security setup: If mutual authentication is completed, in order to protect a message transceived between UE and MME in a radio section, it may prepare for "encryption & integrity protected". If this step is completed, a NAS message (a message between the UE and the MME) can be protected in a radio section. (Protection enables a strange person not to read or modulate a message in a radio section)

4. Location update: A step of registering an MME to which a UE is attached at a HSS and delivering a service profile (QoS profile) subscribed by the UE to the MME by the HSS 5. EPS session establishment: A step of assigning an IP address to a UE and generating an EPS bearer (a DRB tunnel between the UE and an eNB, an S1 GTP tunnel between the eNB and an S-GW, an S5 GTP tunnel between the S-GW and a P-GW) to be used by the UE. When the EPS bearer is generated, a QoS parameter of the EPS bearer is configured based on a QoS profile determined by a PCRF.

The UE ID acquisition and the EPS session establishment correspond to procedures performed in all initial attachment steps. The second, the third and the fourth procedure are performed in a manner of being impacted by a type of a UE ID (IMSI or old GUTI) and information on whether previous user access information is left in a network (MMES).

Figure 5:
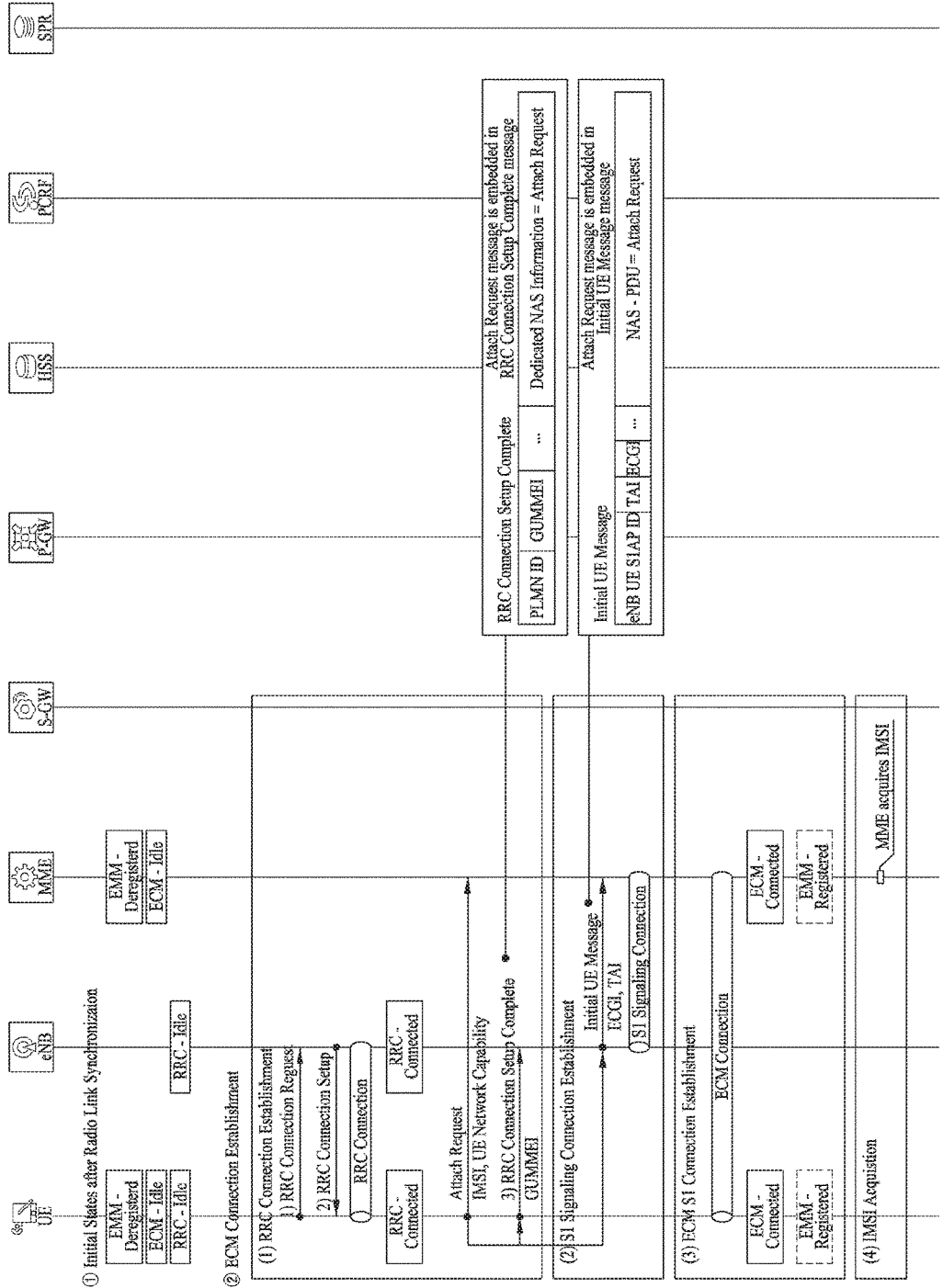
FIG. 5 is an exemplary diagram for explaining an initial access procedure of a user equipment in LTE system.

FIG. 5 is an exemplary diagram for explaining an initial access procedure of a user equipment in LTE system.

Referring to FIG. 5, a user equipment (UE) performs ECM connection establishment after a radio link is synchronized. To this end, the UE transmits an RRC connection establishment request message to a base station. In this case, the RRC connection request (establishment cause="Mobile Originating Signaling") message is transmitted via an SRB 0, which is commonly used by user equipments, and a CCCH corresponding to a logical channel. The UE receives an RRC connection setup message in response to the RRC connection request message. In this case, an SRB configuration resource, which is to be dedicatedly used by the UE, may be allocated in a manner of transmitting the RRC connection setup message via the SRB 0, which is commonly used by user equipments, and the CCCH corresponding to a logical channel. Subsequently, RRC connection is performed.

The UE transmits an attach request and an RRC connection setup complete message. The UE transmits the RRC connection setup complete message to the base station via an SRB 1 and a DCCH (dedicated control channel) and the RRC connection setup complete message is transmitted in a manner of including an attach request NAS message in the RRC connection setup complete message. The base station assigns an eNB UE S1AP ID via an S1AP message in S1-MME interface for S1 signaling connection establishment and delivers an attach request to the MME via an initial UE message.

Figure 6:
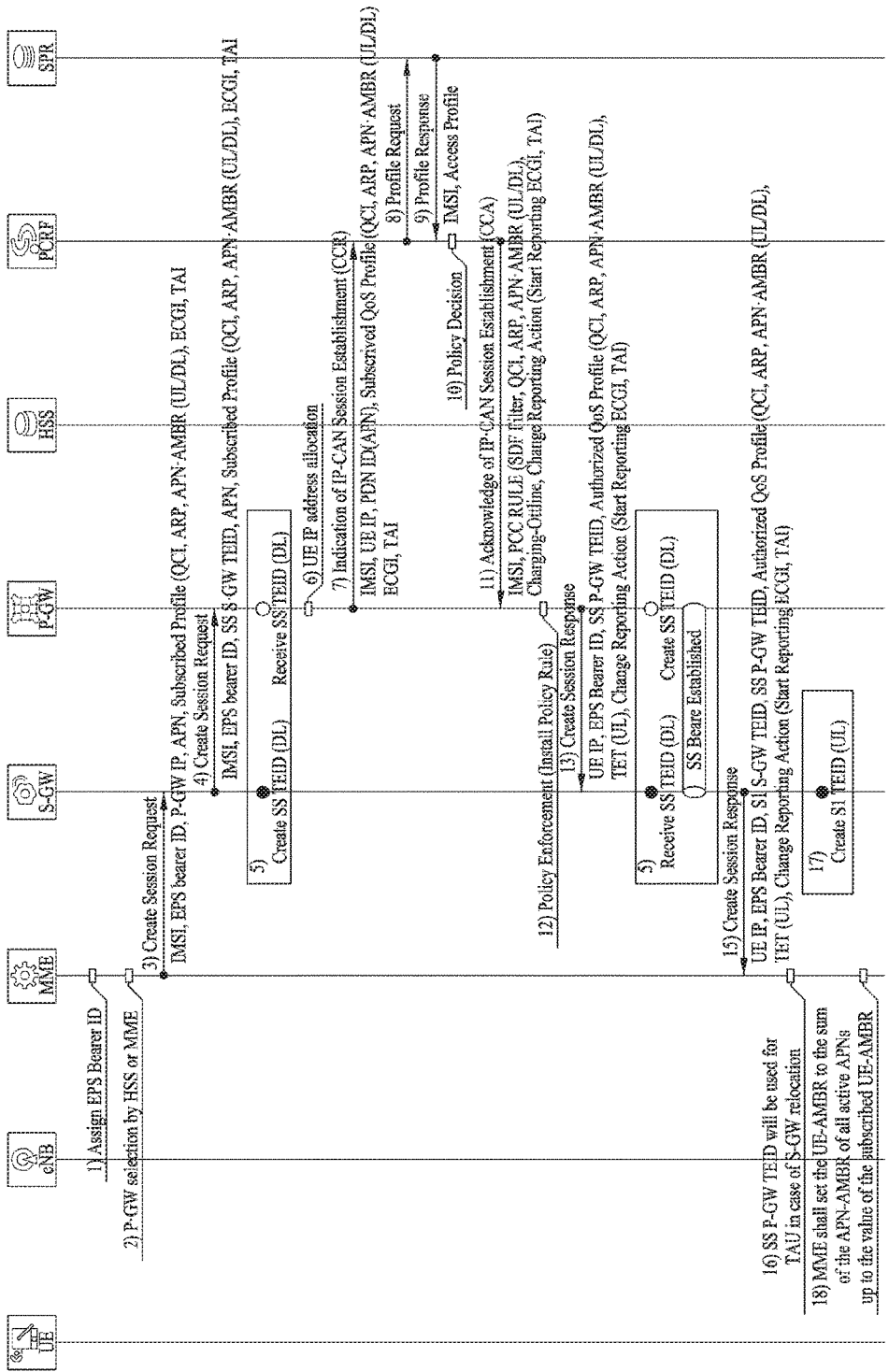
FIG. 6 is an exemplary diagram for specifically explaining an EPS session establishment procedure among an initial access procedure of a user equipment in LTE system.

FIG. 6 is an exemplary diagram for specifically explaining an EPS session establishment procedure among an initial access procedure of a user equipment in LTE system.

An MME establishes an EPS session and a default EPS bearer using user subscription information and allocates a network/radio resource to provide service quality subscribed by a user. In 18) a UE-AMBR calculation step of MME shown in FIG. 6, the MME calculates a UE-AMRB value to be transmitted to an eNB. The MME calculates the UE-AMBR within a range not exceeding the sum of APN-AMBR according to an APN and may be then able to assign the UE-AMBR.

Figure 7:
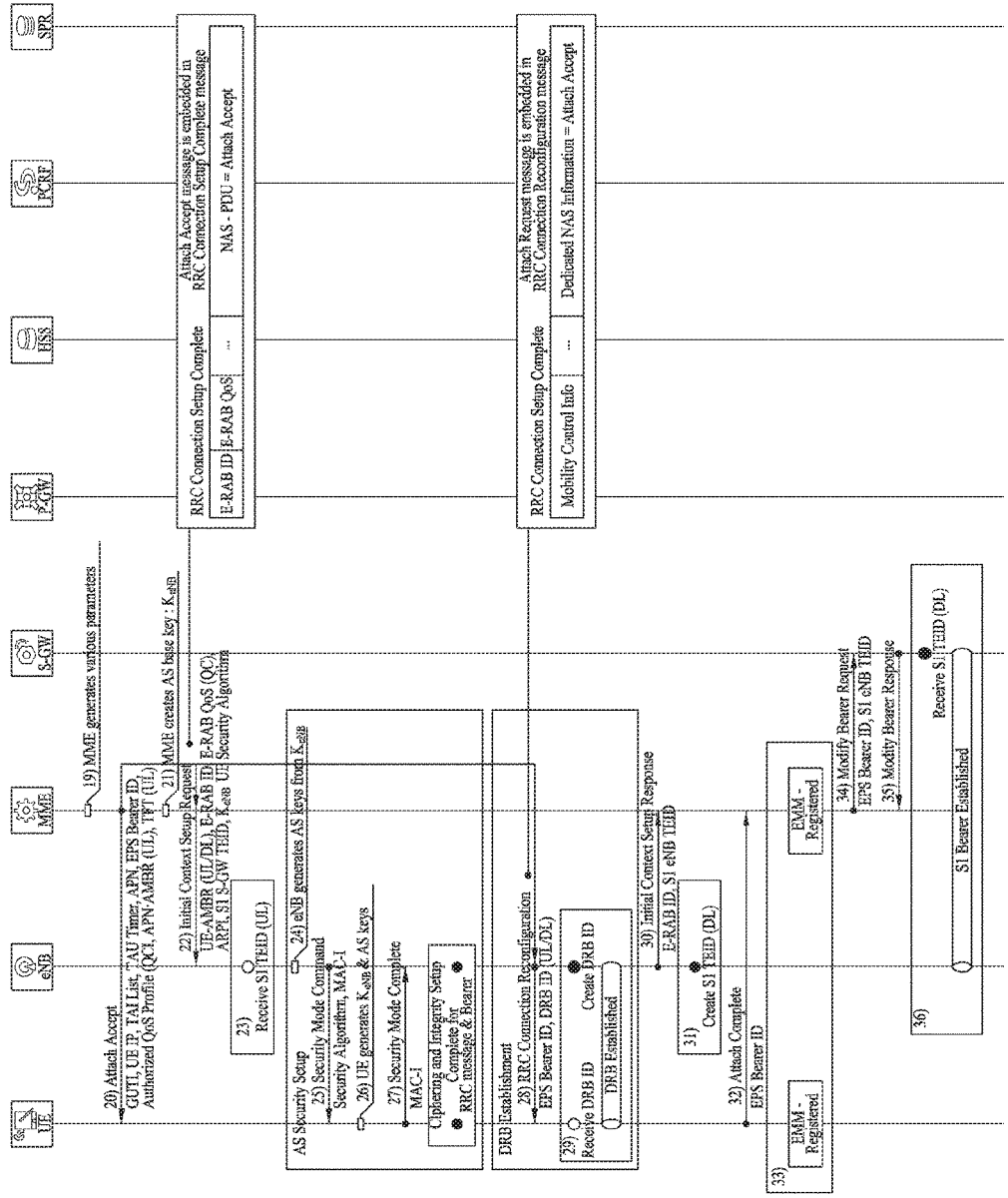
FIG. 7 is a different exemplary diagram for specifically explaining an EPS session establishment procedure among an initial access procedure of a user equipment in LTE system.

FIG. 7 is a different exemplary diagram for specifically explaining an EPS session establishment procedure among an initial access procedure of a user equipment in LTE system.

Referring to FIG. 7, an MME generates various parameters. The MME assigns a GUTI instead of IMSI to a UE. The MME determines a parameter related to TAU control (TAI list assignment, TAU timer value). The MME determines UE-AMBR to be used by the eNB and assigns E-RAB ID.

In 22) step of initial context setup request, UE-AMBR (UL/DL), E-RAB ID, E-RAB QoS, S1 S-GW TEID, KeNB, UE security algorithm are transmitted. The UE-AMBR (UL/DL) corresponds to a QoS parameter controlled by a base station only (since the UE-AMBR (UL/DL) is passing through an identical base station irrespective of an APN used by a user). The E-RAB ID corresponds to a value assigned by the MME. A base station uses the E-RAB ID as an EPS bearer ID. The E-RAB QoS is configured by the MME based on an EPS bearer QoS received from a P-GW. The S1 S-GW TEID corresponds to a UL S1 TEID value received from an S-GW. The KeNB corresponds to a value calculated by the MME from KASME. The base station deducts an AS security key from the KeNB. The UE security algorithm corresponds to a value received from a UE via an attach request message. The UE security algorithm enables the base station to perform AS security setup together with the KeNB. A NAS-PDU corresponds to a NAS message (attach accept).

In relation to DRB configuration of 28), a NAS layer of a UE obtains UE IP address and GUTI in a manner of receiving an RRC connection reconfiguration message and performs communication using the UE IP address and the GUTI.

Figure 8:
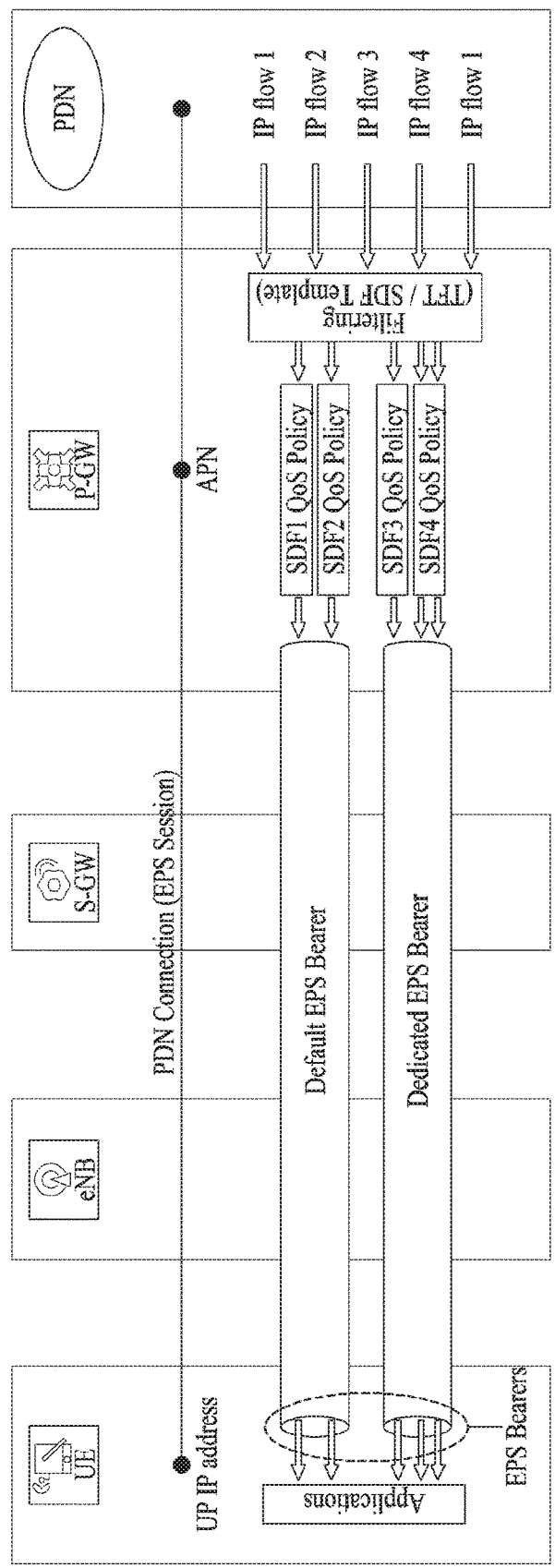
FIG. 8 is an exemplary diagram for explaining an SDF and an EPS bearer.

FIG. 8 is an exemplary diagram for explaining an SDF and an EPS bearer.

A service data flow corresponds to an IP flow or a gathering of IP flows of which user traffic is filtered or classified according to a service. A specific QoS policy is applied to the service data flow according to a subscriber level of a user equipment and an application in use. Since QoS is provided by an EPS bearer, each SDF is transmitted in a manner of being mapped to an EPS bearer capable of satisfying a QoS requirement of each SDF.

An IP address is assigned to an EPS bearer when a UE accesses LTE network and a default EPS bearer is simultaneously generated while PDN (packet data network) connection is generated. A default bearer is generated when a user initially accesses a network and the default bearer is continuously maintained although a service is not used. The default bearer is finally disappeared when the user leaves the network. In case of using a service (e.g., VoD) incapable of properly receiving QoS by the default bearer, a dedicated bearer is generated by on-demand. One default EPS bearer and a plurality of dedicated EPS bearers may be configured according to an APN. It is able to configure maximum 11 EPS bearers.

Figure 9:
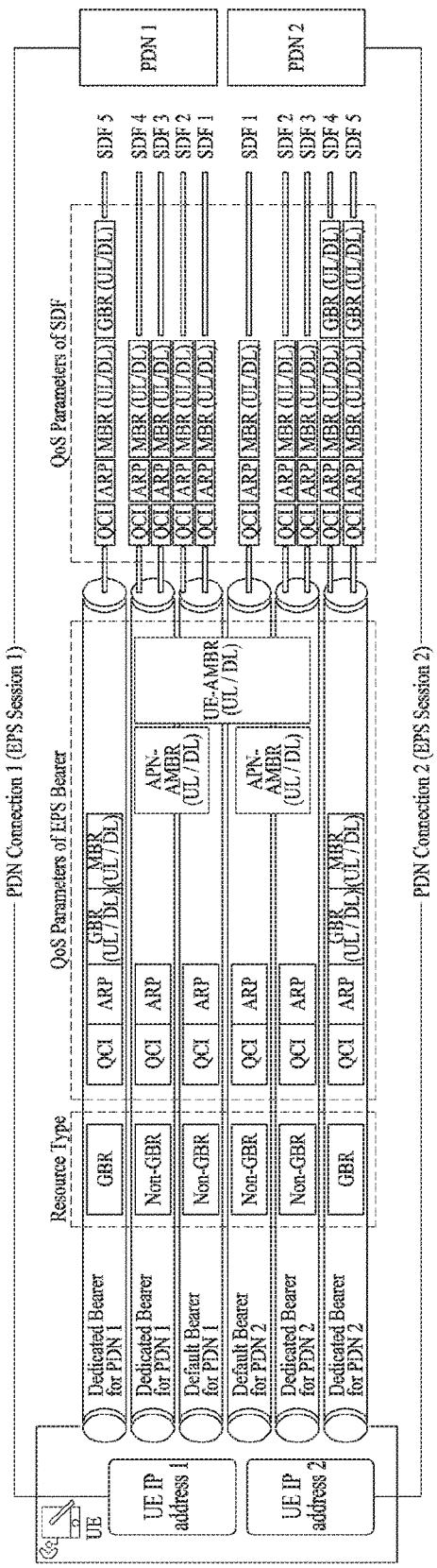
FIG. 9 is a diagram for explaining SDF QoS and EPS bearer QoS.

FIG. 9 is a diagram for explaining SDF QoS and EPS bearer QoS.

In LTE network, a QoS parameter is defined in a service level (SDF QoS parameter) and a bearer level (EPS bearer QoS parameter). An SDF aggregate corresponds to a gathering of SDFs including an identical QCI (QoS class identifier) belonging to an identical EPS session and an ARP (allocation and retention priority) value. The SDFs (SDF aggregate) including an identical QCI and ARP are mapped to a single EPS bearer.

The SDF QoS parameter includes QCI, ARP, GBR, MBR and the like. The EPS bearer QoS parameter includes QCI, ARP, GBR, MBR, APN-AMBR, UE-AMBR and the like. A bandwidth of non-GBR type bearers belonging to an identical PDN is controlled by a maximum value APN-AMBR capable of being used by sharing and a bandwidth of all non-GBR type bearers belonging to an identical UE is controlled by a maximum value UE-AMBR capable of being used by sharing.

SDF QoS

A GBR-type SDF QoS parameter includes QCI, ARP, GBR (UL/DL) and MBR (UL/DL) and a non-GBR-type SDF QoS parameter includes QCI, ARP and MBR (UL/DL).

EPS bearer QoS

A GBR-type bearer QoS parameter includes QCI, ARP, GBR (UL/DL) and MBR (UL/DL) and a non-GBR-type bearer QoS parameter includes QCI, ARP, APN-AMBR (UL/DL) and UE-AMBR (UL/DL).

Figure 10:
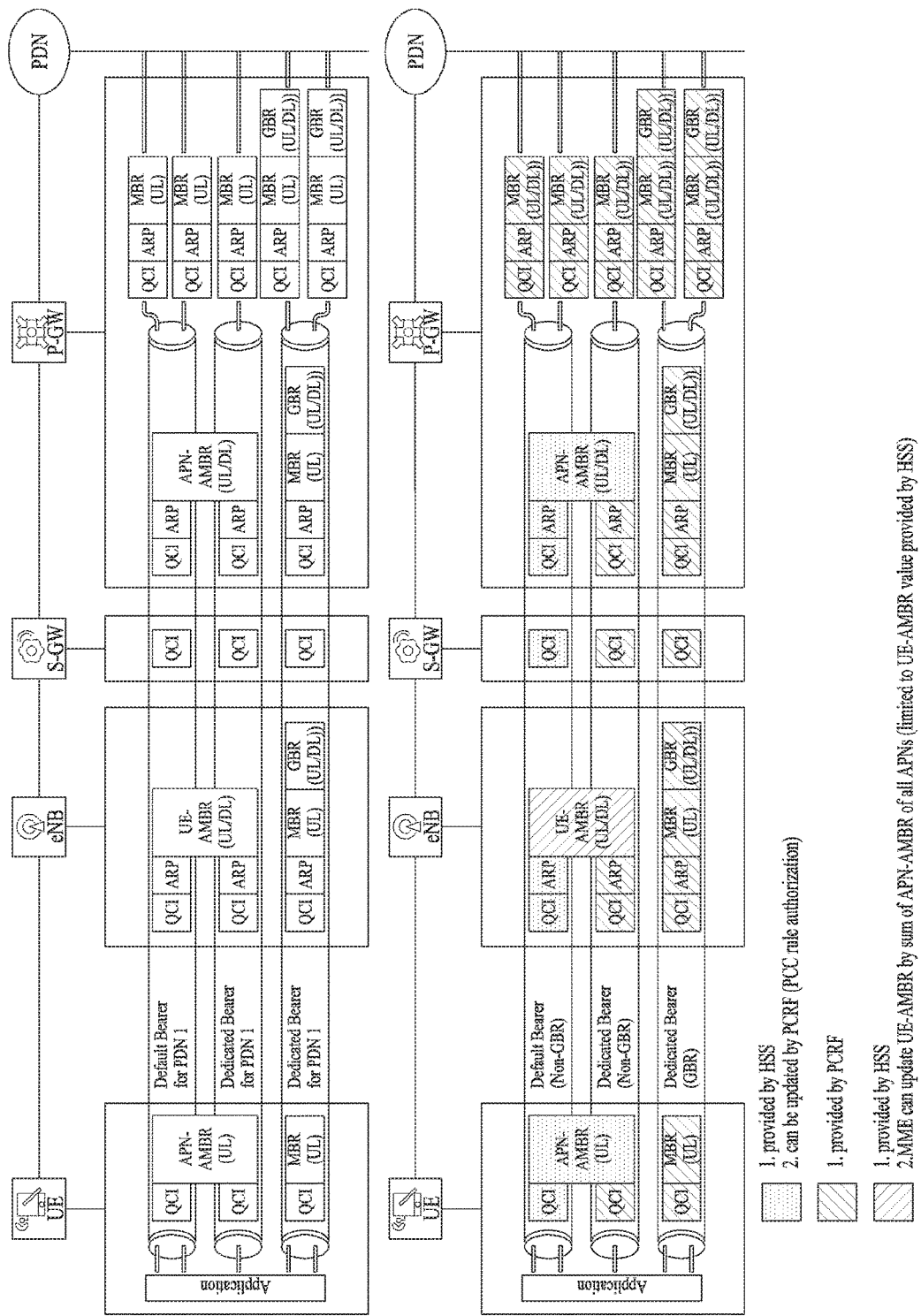
FIG. 10 is a diagram for explaining QoS Enforcement.

FIG. 10 is a diagram for explaining QoS Enforcement.

FIG. 10 shows a position of an EPS entity to which an EPS bearer and SDF QoS parameters are configured and applied. In case of EPS bearer QoS applied to an S-GW, although the EPS bearer QoS is configured in a manner of being similar to a P-GW except APN-AMBR, for clarity, QCI is shown only. The SDF QoS parameter, i.e., QCI, ARP, MBR and GBR are installed in the P-GW. The APN-AMBR is applied to all non-GBR type EPS bearers generated in an identical PDN and is applied to an end point of an EPS bearer, i.e., a UE and the P-GW. A UL value is applied to the UE only and both a UL and a DL value are applied to the P-GW. The UE-AMBR is applied to all non-GBR type EPS bearers generated in an identical UE and is applied to an eNB in which all PDN traffic is transmitted. MBR is applied to a GBR type bearer only, an uplink value is applied to the UE and the eNB only and a downlink value is applied to the S-GW and the P-GW only.

Figure 11:
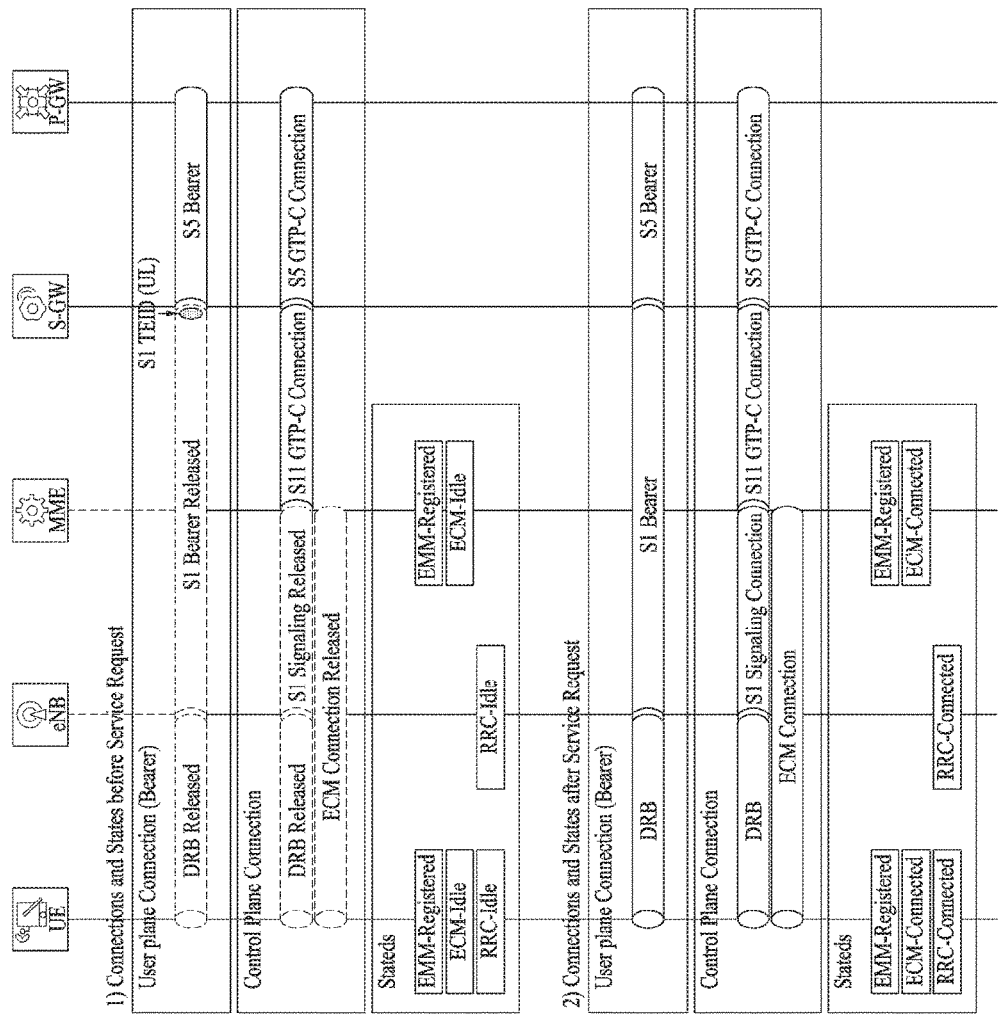
FIG. 11 is a diagram for explaining connection and states before a service is requested and after the service is requested.

FIG. 11 is a diagram for explaining connection and states before a service is requested and after the service is requested.

Before a service is requested, a UE is in an EMM-registered state and an ECM/RRC-idle state. When a UE is registered at a network but S1 connection is released due to traffic deactivation and a radio resource is not allocated, in particular, when the UE is in EMM-registered state but the UE is in ECM-idle state, if traffic to be transmitted by a user (UE-triggered new traffic) occurs or traffic to be transmitted to a UE by a network (network-triggered new traffic) occurs, the user asks the network to provide a service. In this state, S5 GTP-C tunnel and S11 GTP-C tunnel are maintained and ECM connection is released in a control plane. And, S5 bearer and UL S1 bearer are maintained and DL S1 bearer and DRB are released in a user plane.

If a service request is successfully performed, a UE is switched to ECM-connected state and transmits/receives traffic in a manner of configuring ECM connection (RRC connection+S1 signaling connection) in the control plane and configuring E-RAB (DRB and S1 bearer) in the user plane. In this case, in case of transmitting traffic to the UE by a network, it may firstly inform the UE of traffic to be transmitted to the UE and it may be able to make the UE perform a service request.

Figure 12A:
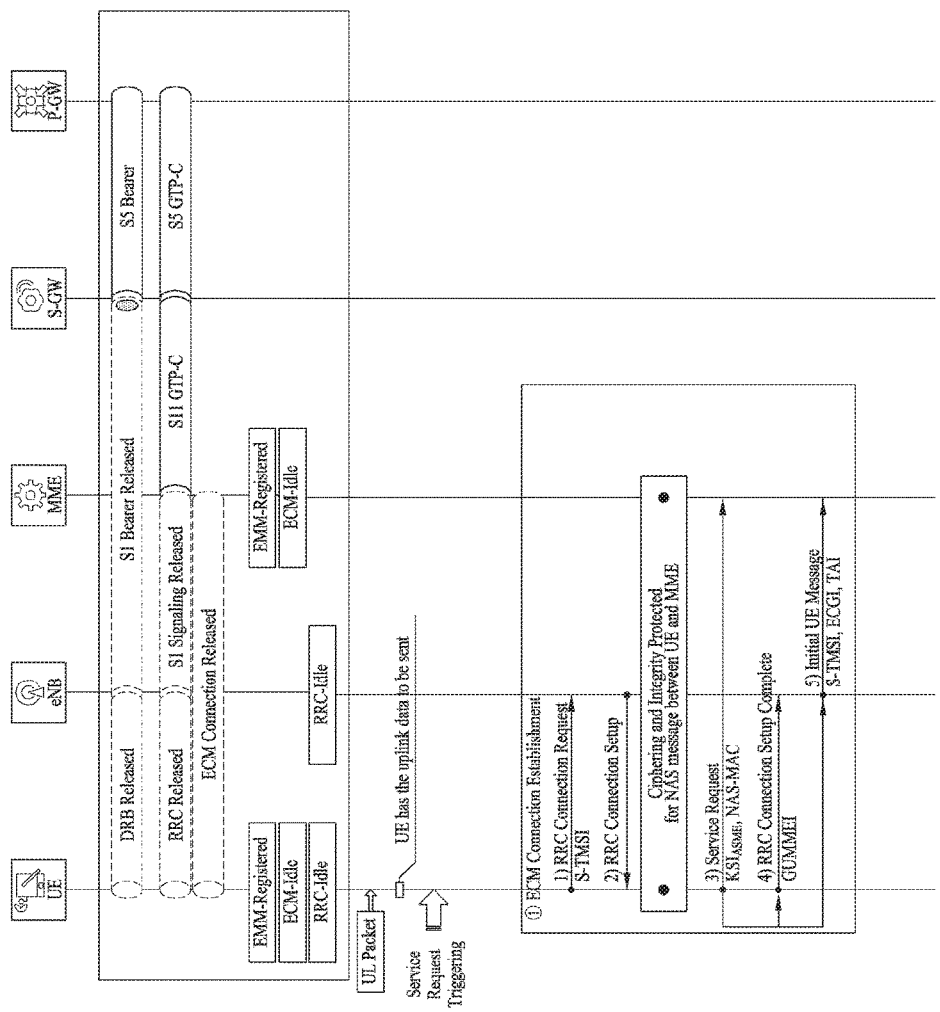
FIGS. 12a, 12b and 12c are diagrams for explaining a UE-trigger service request procedure.
Figure 12B:
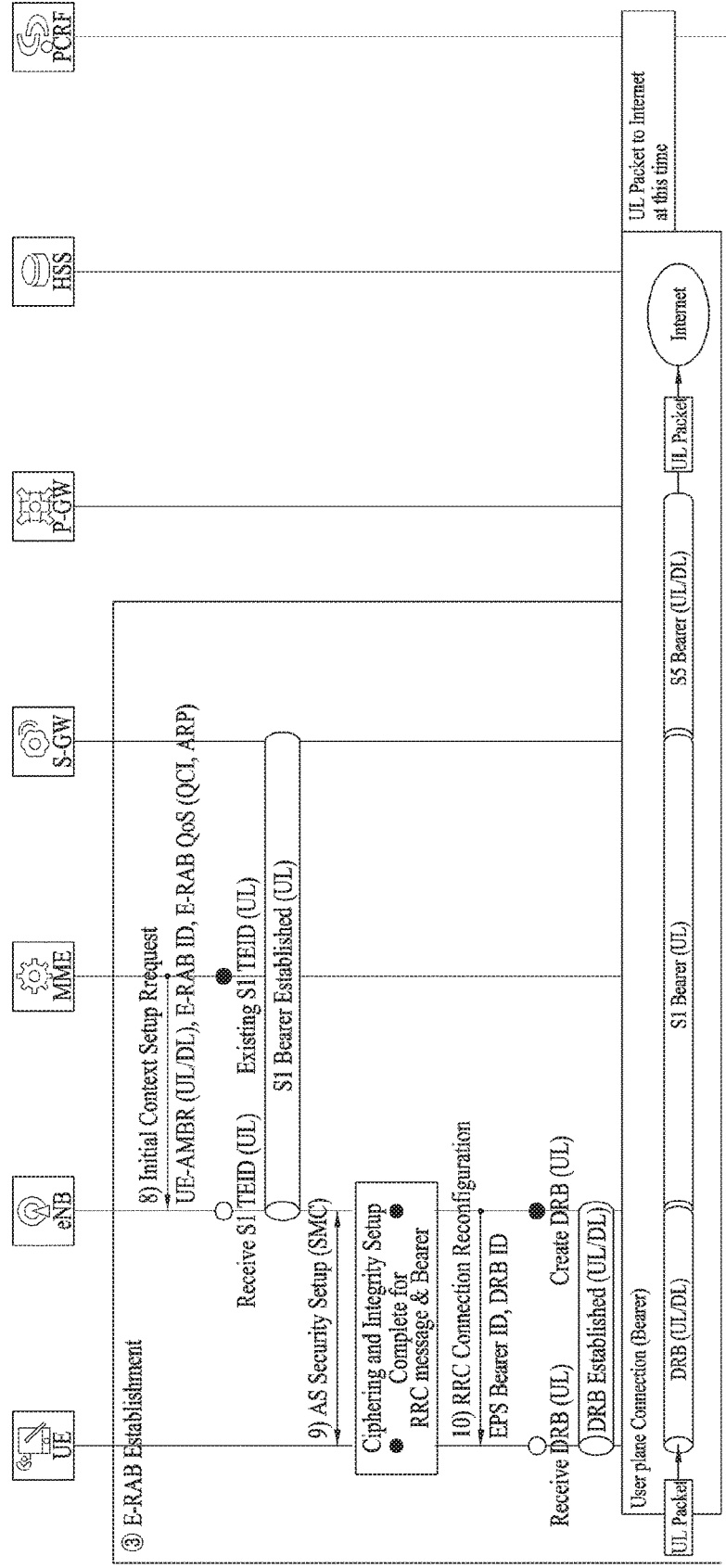
Figure 12C:
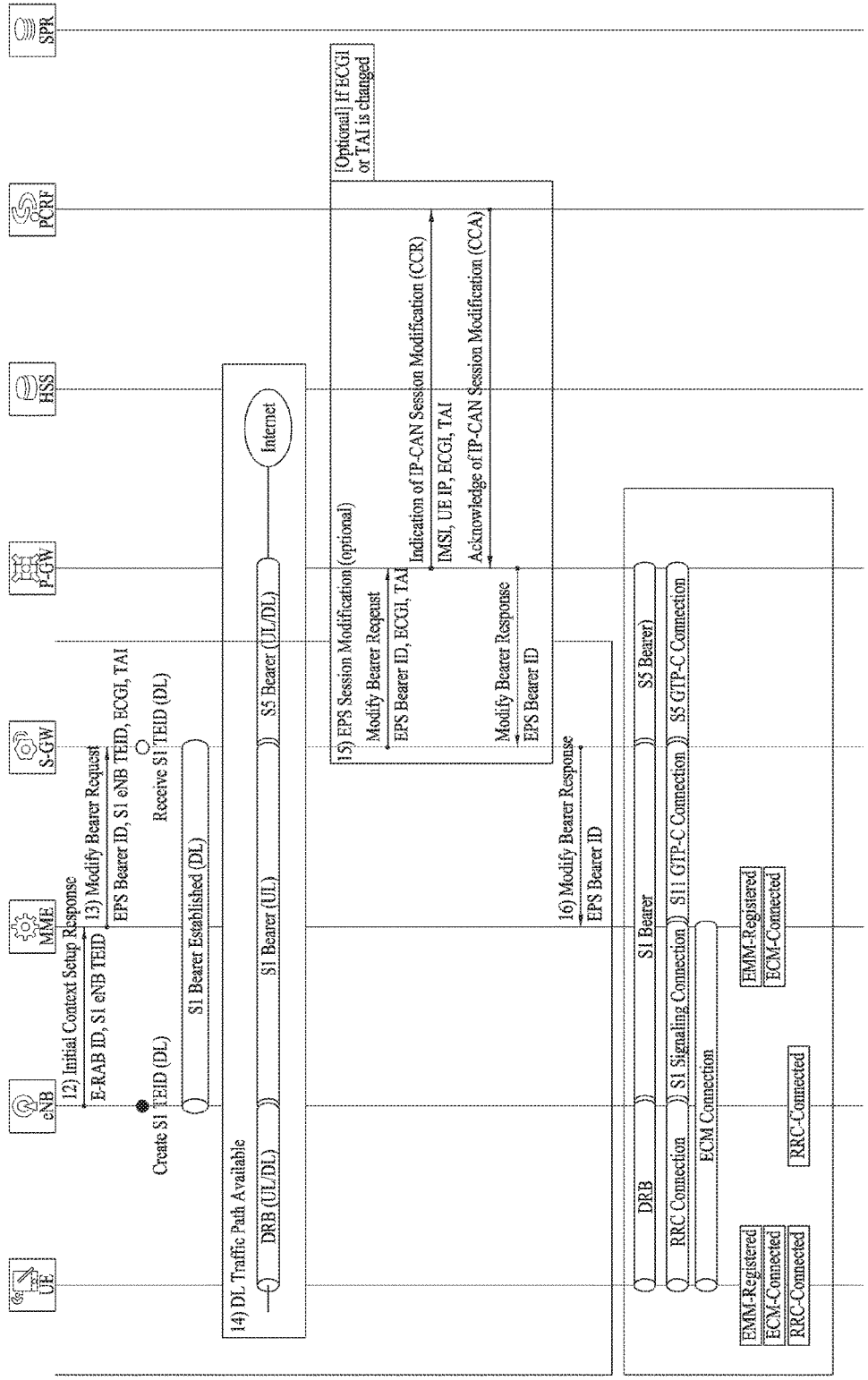

FIGS. 12a, 12b and 12c are diagrams for explaining a UE-trigger service request procedure.

Referring to FIG. 12a, a UE establishes ECM connection by transmitting a service request message to an MME. The service request message is delivered to the MME in a manner that RRC connection is setup in a radio section and S1 signaling connection is established in a section between the eNB and the MME.

The service request message is transmitted to the eNB via an RRC connection setup complete message on a radio link between the UE and the eNB and the service request message is delivered to the MME via an initial UE message corresponding to an S1AP message between the eNB and the MME.

Referring to FIG. 12b, a base station transmits an EPS bearer ID for DRB configuration and a DRB ID to a UE via the RRC connection reconfiguration message mentioned earlier in 10). In order to generate a DRB corresponding to an EPS bearer in a radio section, a base station assigns a DRB ID, configures a DRB QoS parameter in accordance with E-RAB QoS received from the MME, and delivers an RRC connection reconfiguration message to the UE. Having received the RRC connection reconfiguration message from the base station, the UE generates the DRB and SRB2.

If the DRB and the SRB2 are generated, UL EPS bearers are all set from the UE to the P-GW and it may be able to transmit uplink traffic occurred in the UE.

Referring to FIG. 12c, in the steps 12), 13) and 16), a DL S1 bearer is configured between the eNB and the S-GW. In the step 12), the eNB assigns a DL S1 TEID (S1 eNB TEID) for an S1 bearer and transmits the DL S1 TEID to the MME via an initial context setup response message corresponding to a response for an initial context setup request message received in the 8) step (the 8) step shown in FIG. 12b). In the step 13), the MME delivers the S1 eNB TEID to the S-GW via a modify bearer request message and the S-GW configures a DL S1 bearer by receiving the S1 eNB TEID. In the step 16), the S-GW informs the MME of completion of DL S1 bearer configuration via a modify bearer response message.

When the step 13) is completed, a DL S1 GTP-U tunnel from the S-GW to the eNB is generated and DL EPS bearers are all set from the P-GW to the UE. Hence, DL traffic transmission heading to the UE may be enabled. In particular, a DL traffic path becomes available.

In the foregoing description, an initial attach procedure, a UE-trigger service request procedure and the like in LTE system have been explained.

In the following, a network structure in which a plurality of communication systems according to the present invention are interlocking or interworking is explained.

Figure 13:
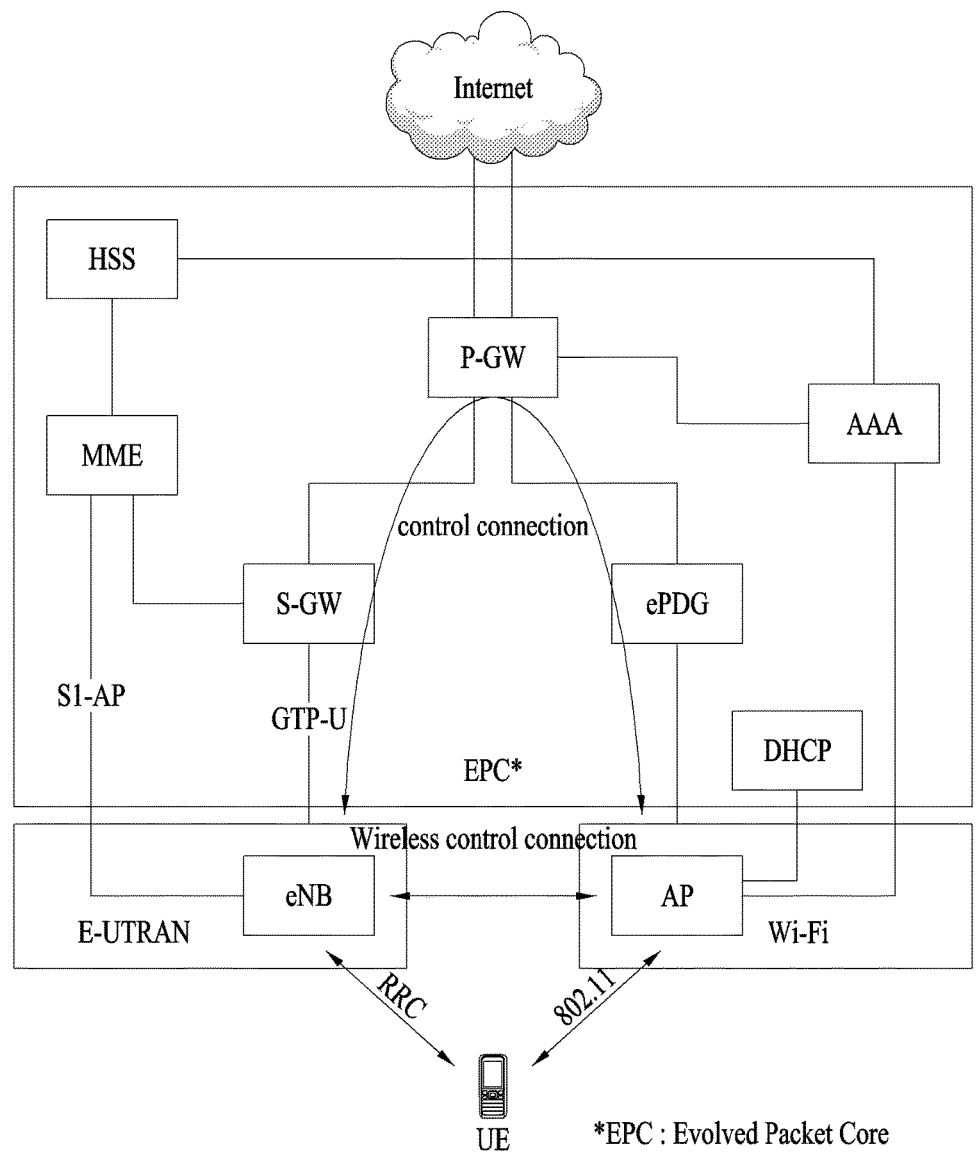
FIG. 13 is a diagram for an example of a network structure for explaining an interworking structure between a first communication system (e.g., LTE system) and a second communication system (e.g., Wi-Fi system)

FIG. 13 is a diagram for an example of a network structure for explaining an interworking structure between a first communication system (e.g., LTE system) and a second communication system (e.g., Wi-Fi system).

In a network structure shown in FIG. 13, there may exist a backhaul control connection between an AP and an eNB or a wireless control connection between the AP and the eNB via a backbone network (e.g., P-GW or EPC (evolved packet core)). For a peak throughput and data traffic off-loading, a UE can support both a first communication system (or a first communication network) using a first wireless communication scheme and a second communication system (or a second communication network) using a second wireless communication scheme at the same time via interworking among a plurality of communication networks. In this case, the first communication network or the first communication system is called a primary network or a primary system, respectively. The second communication network or the second communication system may be called a secondary network or a secondary system, respectively. For instance, the UE may be configured to support LTE (or LTE-A) and WiFi (short range communication system such as WLAN/802.11) at the same time. This sort of UE may be called a multi system supporting UE (multi-system capability UE) and the like.

In the network structure shown in FIG. 13, a primary system may correspond to a network of wide coverage and the network for transmitting control information. Examples for the primary system may include WiMAX or LTE (LTE-A) system. Meanwhile, a secondary system corresponds to a network of small coverage and a system for transmitting data. For instance, the secondary network may correspond to WLAN or a wireless LAN system such as WiFi.

The present invention assumes following.

The present invention is explained under an assumption that follows.

Assume that an entity for controlling interworking corresponds to an entity belonging to a cellular network and assume that an interworking function is implemented in three entities described in the following.

e-NB—reuse existing entity

MME (mobility management entity)—reuse existing entity

IWME (interworking management entity)—define new entity

An interworking function is associated with an interworking-related procedure capable of being occurred between an eNB and a UE or between an eNB and an AP and an entity for controlling interworking stores/manages AP information. An eNB/MME/IWME store/manage information of APs belonging to coverage of the eNB/MME/IWME.

Assume that a connection is established on a radio link between an AP corresponding to an access point of a secondary system (e.g., WiFi) and a base station (eNB) corresponding to an access point of a primary system (e.g., LTE system or a cellular communication system such as WiMAX). In the present invention, an AP including a wireless interface with an eNB is called an eAP. In particular, the eAP should support not only 802.11 MAC/PHY but also LTE protocol stack or WiMAX protocol stack for communication with an eNB. The eAP plays a role of a UE. This means that the eAP can communicate with an eNB.

Figure 14:
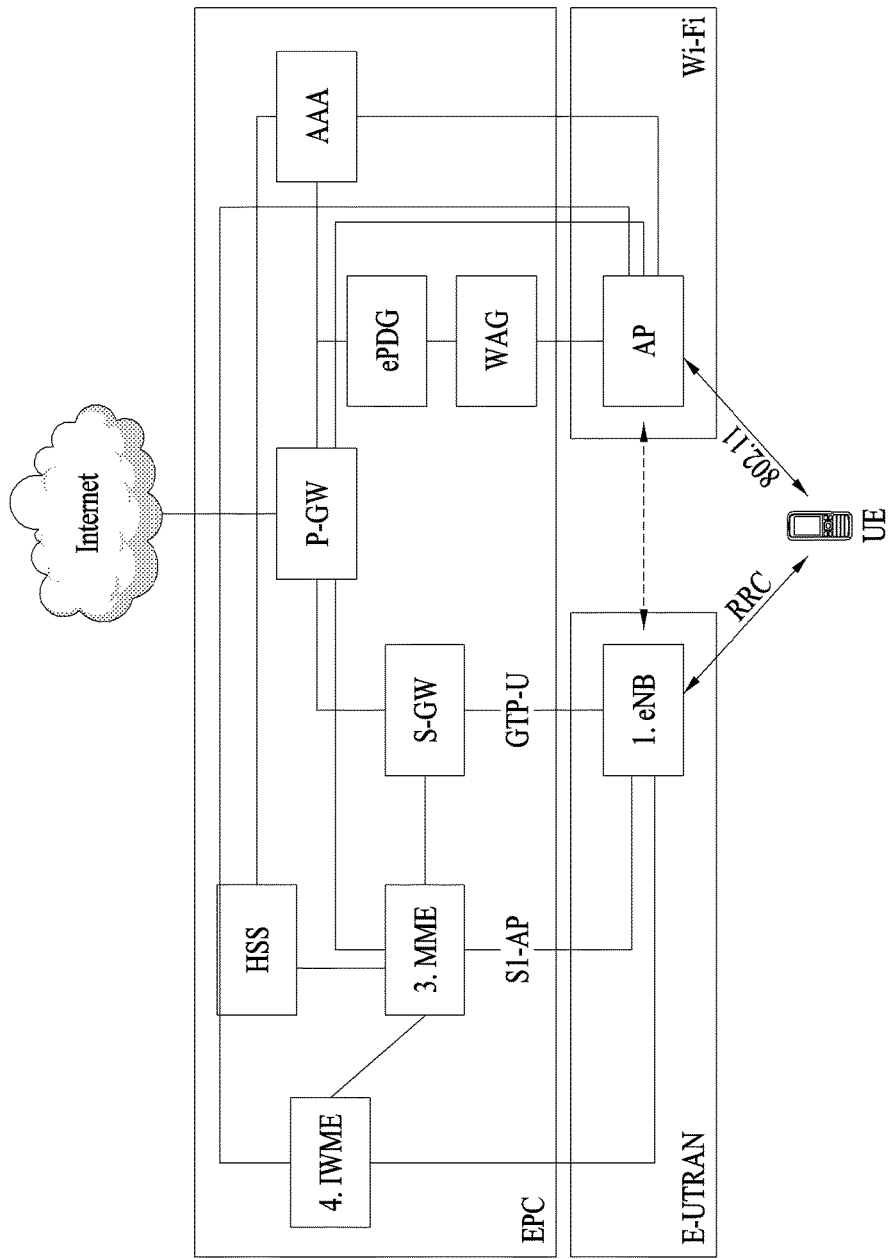
FIG. 14 is an exemplary diagram for a network structure of WiFi-cellular interworking according to the present invention.

FIG. 14 is an exemplary diagram for a network structure of WiFi-cellular interworking according to the present invention.

According to a technology of the present invention, in environment at which a user equipment capable of transmitting and receiving WiFi and a cellular network at the same time exists, in order for the multi-RAT user equipment to more efficiently use a dual mode or a WiFi-cellular convergence network, a cellular network can manage information of an AP according to 4 methods described in the following.

Method 1. Use of air interface between an eNB and an AP

An eNB controls an AP in a manner of being similar to a method of controlling a normal UE using a wireless control connection with the AP.

Method 2. Use of backhaul interface between an eNB and an AP

An eNB controls an AP using a wireless control connection with the AP.

Method 3. Use of control interface between an MME and an AP

An AP is controlled using a control connection between an MME and the AP (i.e., a secondary system).

Method 4. Use of control interface between an IWME and an AP

An AP is controlled using a control connection between an IWME and the AP (i.e., a secondary system).

Figure 15:
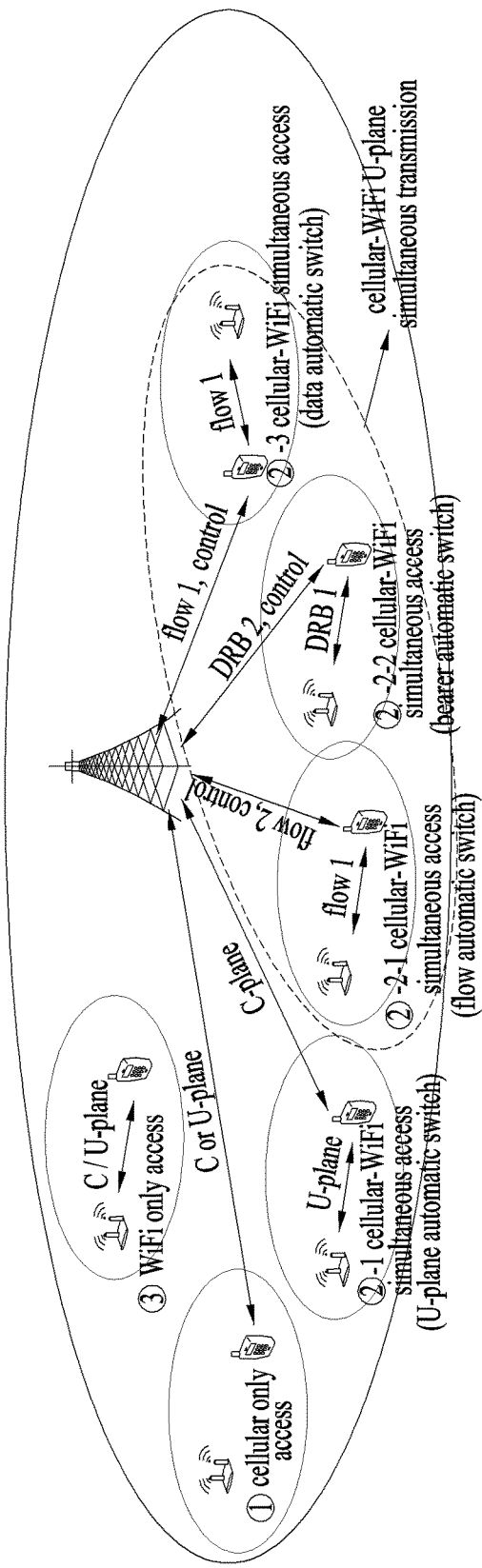
FIG. 15 is an exemplary diagram for explaining a scenario of a WiFi-cellular convergence network.

FIG. 15 is an exemplary diagram for explaining a scenario of a WiFi-cellular convergence network.

①  scenario of FIG. 15 is a cellular only access scenario of a UE. In order for a UE to perform WiFi automatic switching/simultaneous transmission in a state that the UE accesses a cellular network only, it is required to define a technology in advance. AP information management for interworking is performed in a network level (cellular-WiFi) and WiFi discovery and WiFi network access are performed in a device level (cellular—device—WiFi). ②-1 to ②-3 show WiFi automatic switching of a user plane (U-plane) between cellular and WiFi, WiFi automatic switching of a flow, WiFi automatic switching of a bearer and WiFi automatic switching of data, respectively. If cellular-WiFi U-plane is automatically switched according to ②-1, all data are transmitted via WiFi only. If cellular-WiFi U-plane is switched to be transmitted at the same time according to ②-2 and ②-3 scenario, data may be transmitted at the same time via both WiFi and a cellular network using a bandwidth segregation or aggregation technique. In this case, as shown in ②-2, the bandwidth segregation corresponds to automatic switching according to a flow (service/IP flow). Flows different from each other are transmitted via RATs different from each other. In the ②-2, automatic switching according to a flow may correspond to one or more service/IP flow(s). In particular, the automatic switching may correspond to switching in a flow unit (②-2-1) or switching according to a data radio (or EPS) bearer (②-2-2). As shown in ②-3, although flows are identical to each other, the bandwidth aggregation enables data to be transmitted via RATs different from each other in data unit.

As shown in the ② scenario, if WiFi automatic switching is completed, it is able to perform WiFi-based cellular link control as shown in ③ scenario. Cellular link-related paging or control on a radio link failure may be received via a WiFi link.

Figure 16:
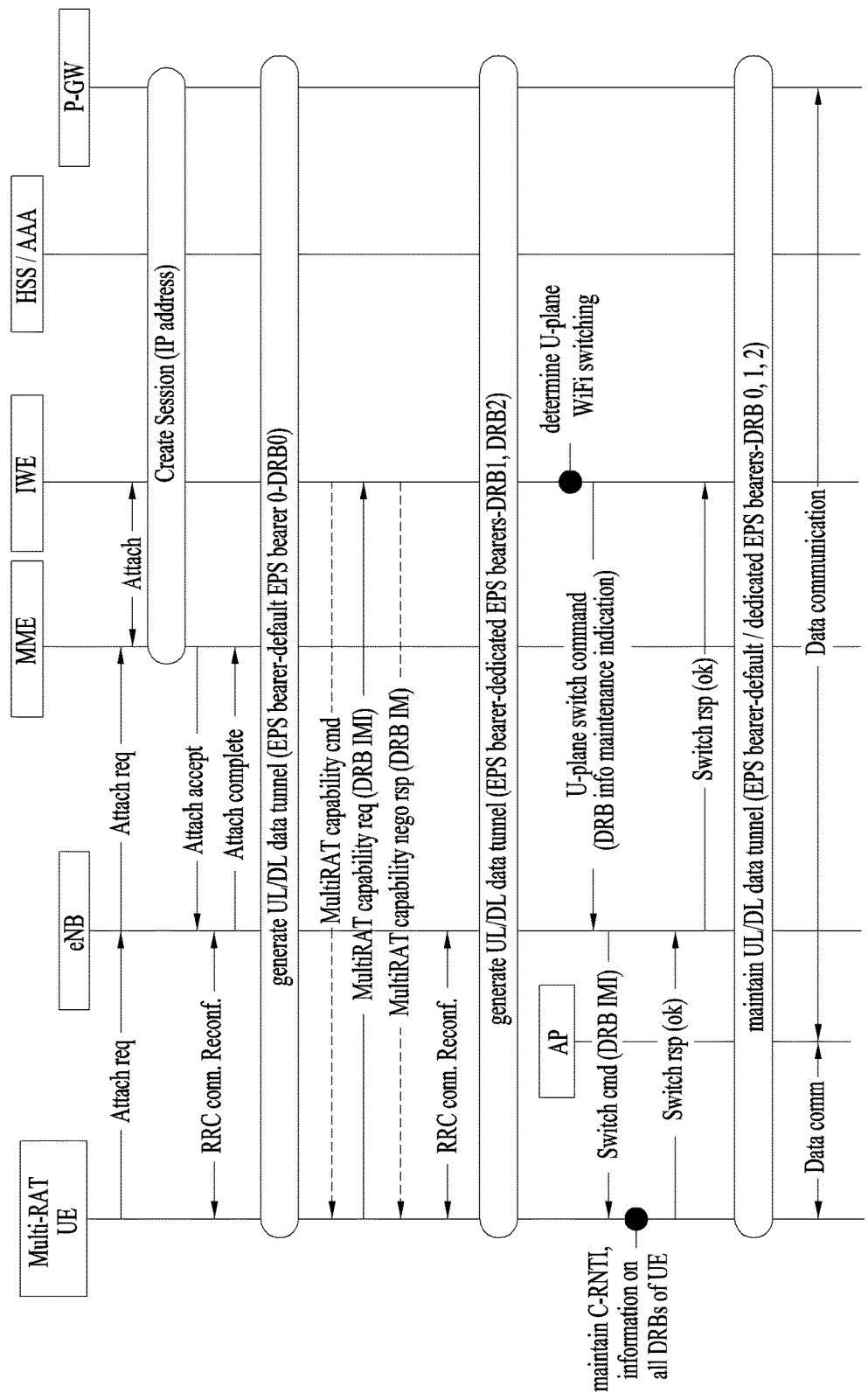
FIG. 16 is an exemplary diagram for explaining a procedure of generating a data radio bearer in 3GPP system.

FIG. 16 is an exemplary diagram for explaining a procedure of generating a data radio bearer in 3GPP system.

Referring to FIG. 16, a UE (multi-RAT UE) performs an attach procedure with a network and receives an RRC connection reconfiguration message from a base station. Subsequently, if the attach procedure is completed, the UE generates a UL/DL data tunnel with the network. In this case, a default EPS bearer 0-DRB 0 is generated among EPS bearers. RRC connection reconfiguration is performed again and a UL/DL data tunnel is additionally generated. In this case, dedicated EPS bearers (DRB 1 and DRB 2) are generated.

If an IWE determines U-plane WiFi switching, the IWE transmits a U-plane switch command message to the base station (eNB) and the base station delivers the command to the UE. The UE transmits a switch response message to the base station in response to the U-plane switch command message. Subsequently, the UE performs release of the generated UL/DL data tunnel. The UE releases the dedicated EPS bearers. In case of entering an idle mode, the UE releases C-RNTI and all DRBs. If the dedicated EPS bearers are released, DRB-related information of the UE is disappeared. After the aforementioned release procedure is performed, the UE may perform data communication with an AP of WiFi.

While the UE performs data communication with the AP of WiFi, the IWE may determine U-plane cellular switching. When the U-plane cellular switching is determined, the IWE transmits a U-plane switch command message (or U-lane cellular switch command message) for commanding the U-plane cellular switching to the base station (eNB) and the base station delivers the command message to the UE. The UE transmits a switch response message to the base station in response to the U-plane cellular switch command. Subsequently, the UE generates UL/DL data tunnel. In this case, a dedicated EPS bearer 1 (corresponding to a DRB 1) and a dedicated EPS bearer 2 (corresponding to a DRB 2) are generated.

Meanwhile, in case of entering an idle mode, it is determined to perform a procedure again from a connection request procedure and a default EPS bearer (corresponding to a DRB 0) is generated. Subsequently, the UE may perform data communication again with a cellular network.

Since a legacy inter RAT technology is designed based on a request of a UE, interworking between a wireless LAN and a cellular network is not necessary, a specific network server manages wireless LAN information and inter RAT handover is enabled by the request of the UE. Moreover, although the UE is able to access multiple RATs at the same time, simultaneously accessing multiple RATs may be enabled in a manner of supporting flow mobility/IP-flow mapping in a network level only without controlling in a radio level. For this reason, the legacy technology requires no control connection between an AP and a cellular network and accessing multiple RATs has been performed based on a request of the UE. As mentioned in the above, according to a related art, since it is difficult to precisely identify a situation of a network and selection of a RAT is performed based on a UE, there is a restriction on enhancing efficiency of the whole of a network.

In order to enhance not only QoS of a UE but also efficiency of overall network via a use of multi-RAT, it is necessary to provide a network-based tightly-coupled multi-RAT management technology rather than a technology based on a request of a UE. To this end, it is required to perform a more efficient and faster inter-RAT interworking in a manner of establishing a direct control connection between RATs different from each other in a network level and data of a UE should be transmitted by a main agent of the interworking using a best RAT. Moreover, if data mobility occurs between RATs in the aforementioned scenario, it is necessary to define the data mobility to be seamlessly performed. It is necessary to define overall procedure for various scenarios to support the seamless data mobility.

As shown in FIG. 16, it is not defined whether to maintain a data radio bearer (DRB) generated/mapped by a 3GPP system (e.g., LTE system) and a (dedicated) EPS bearer after the data mobility to a different RAT is performed. According to FIG. 16, when data transmitted by a UE via a cellular network is switched to a different RAT, if an activity using the cellular network does not exist for a prescribed time, a corresponding data radio bearer is released. Yet, if data mobility is faster in interworking between a wireless LAN and a cellular network (WiFi-cellular) and in order to provide QoS provided by the cellular as it is, although a specific data flow is switched, it is necessary to have a method of maintaining information on a data radio bearer (DRB) for the data flow as it is in a UE or a network entity.

To this end, if a network or a UE determines to switch U-plane or a specific data flow (or a DRB, i.e., service/IP flow(s)) to other RAT, the present invention proposes that the UE/eNB/MME maintains information on the switched data flow (or a radio bearer) as it is.

Definition on DRB information maintenance indication: whether to use DRB information maintenance indication (DRB IMI) may be configured when a UE negotiates multi-RAT capability with an IWE (or eNB, MME). When the multi-RAT capability negotiation is performed, it is able to indicate whether to use the DRB information maintenance indication via a multi-RAT capability request/response message. Meanwhile, whether to use the DRB information maintenance indication may be indicated by a general mandatory parameter at times other than the time of the multi-RAT capability negotiation. When the DRB information maintenance indication is indicated to be used (e.g., if a bit for indicating a use of the DRB information maintenance indication is set to 1), in case of performing data switch, a network and a UE may determine whether to maintain a DRB of a cellular network or an S1 resource-related information using the DRB information maintenance indication bit in a data switch indication message.

When the IWE transmits a message for indicating a data U-plane or a specific flow (or a radio bearer) to be switched to WiFi, the present invention proposes to indicate information on a DRB/S1 data bearer in a UE/eNB to be maintained as it is in a manner that the UE sets an indication bit (e.g., 1) indicating whether to maintain resource-related information on the data flow (or a radio bearer) in the message. A same indication may be transmitted to an MME via an MME-IWE interface message or the like.

FIG. 17 is an exemplary diagram for explaining Multi-RAT capability negotiation for indicating DRB information maintenance and data (U-plane, DRB, flow) switch procedure using a case of U-plane switching.

Referring to FIG. 17(a), a UE (multi-RAT UE) generates a UL/DL data tunnel (default EPS bearer) after an attach procedure with a network is completed. Subsequently, as shown in FIG. 17(b), the UE may negotiate with an IWE in a multi-RAT capability negotiation procedure (multi-RAT capability request/response) whether to use DRB information maintenance indication. Subsequently, the UE may generate a UL/DL data tunnel (dedicated EPS bearer) with the network.

Referring to FIG. 17(c), when the multi-RAT capability negotiation is performed, if it is determined to use the DRB information maintenance indication, the IWE determines to switch U-plane to WiFi and transmits a U-plane switch command message for commanding the UE to switch to WiFi to an eNB to indicate whether to maintain DRB information. And, the eNB may deliver the message to the UE via a switch command message. If the switch command message received from the eNB indicates to maintain DRB information, all DRB-related information of the UE are maintained.

Embodiment 1: Case of Switching all Data Paths of UE into WiFi

Embodiment 1 explains an example for a case (U-plane automatic switch) of switching all data paths of a UE into WiFi. In this case, data transmission using a cellular network is not performed for a prescribed time. This may lead a cellular status of the UE to enter RRC idle. According to a legacy RRC idle mode, a UE/eNB/MME releases data radio of the UE and S1-related resource information and maintains an S5 bearer only. Yet, the present invention proposes to transmit DRB information maintenance indication to a message for commanding U-plane to be switched into WiFi to enable an IWE to maintain information on all DRB/S1 data bearers generated to the UE as it is.

The DRB information maintenance indication may correspond to a UE-specific 1-bit indication for a specific UE. For instance, if a "DRB information maintenance indication" field of a message for indicating all generated DRBs to be switched is set to 1, a UE maintains at least one selected from the group consisting of C-RNTI (cell radio network temporary identifier), all DRB (data radio bearer) IDs, AS security information and ECGI (E-UTRAN cell global identifier). An eNB maintains such UE information as the C-RNTI of the UE, all DRB IDs of the UE, an eNB S1AP UEID, an MME S1AP UEID, an EPS bearer ID, a DRB ID, an E-RAB ID, an S1 TEID (UL/DL), QCI, ARP, UE-AMBR (UL/DL), ECGI, TAI and AS security info as it is. An MME maintains eNB S1AP UE ID, MME S1AP UE ID and ECGI as it is.

Embodiment 2: Case of Switching Specific DRB of UE into WiFi (DRB Automatic Switch)

Embodiment 2-1: Case that Specific DRB Corresponds to DRB Mapped to Default EPS Bearer A DRB mapped to a default EPS bearer corresponds to a bearer which is not released until a status becomes an idle status. In this case, assume that DRB information maintenance indication is always set to 1 or a UE/eNB is able to maintain the information although the information is not transmitted. When the DRB mapped to the default EPS bearer has no data to transmit, if the DRB is released, the DRB may transmit the DRB information maintenance indication to maintain the information until the DRB enters an idle status.

Embodiment 2-2: Case that Specific DRB Corresponds to DRB Mapped to Dedicated EPS Bearer If an IP flow of a quality of service (QoS) level, which is incapable of being supported by a default EPS bearer, occurs except a DRB mapped to the default EPS bearer, a dedicated EPS bearer is additionally generated and a DRB for the dedicated EPS bearer may be newly mapped. In this case, if all (one or more) IP flows used to be transmitted by the DRB are switched to WiFi, a network may transmit a message (e.g., WiFi data switch command message) indicating switch of a specific DRB to a UE in a manner of adding DRB information maintenance indication to the message.

The message may correspond to 1 bit indication for a specific DRB ID (DRB-specific).

If "DRB information maintenance indication" for a specific DRB ID of a message, which indicates a specific DRB to be switched, is set to 1, a UE maintains the DRB ID and information related to the DRB ID. And, an eNB maintains such information related to the DRB ID of the UE as DRB (data radio bearer) ID of the UE, EPS bearer ID, E-RAB (E-UTRAN radio access bearer) ID, S1 TEID (tunnel endpoint ID) (UL/DL), QCI (QoS class identifier), ARP (allocation retention priority) as it is.

Embodiment 3: Case of Switching Specific Flow Mapped to Specific DRB of UE into WiFi If all services/IP flow(s) in a DRB to which a specific flow is mapped are switched, it may be able to perform a procedure according to the aforementioned Embodiment 2. Yet, if one or more flows are mapped to a specific DRB and it is necessary to switch a specific flow only among the one or more flows, it is not necessary to transmit DBR information maintenance indication.

When a UE switches back data into a cellular network, according to a related art, a procedure for obtaining C-RNTI and all DRBs-related information of the UE should be added. Yet, according to embodiment of the present invention, as shown in FIG. 17(d), when the UE switches back data into the cellular network, it is able to immediately switch the data without RRC connection and reconfiguration procedure. In particular, while the UE performs data communication with an AP of WiFi network, if an IWE determines to switch U-plane into cellular, the IWE transmits a U-plane switch command message to an eNB and the eNB delivers the U-plane switch command message to the UE. The UE transmits a U-plane switch response message to the eNB in response to the U-plane switch command message and the eNB delivers the U-plane switch response message to the IWE. The IWE performs IP flow/address binding update procedure with a P-GW. Subsequently, the UE is able to perform data communication with a cellular network (e.g., eNB). As mentioned in the foregoing description, the UE may immediately switch data without RRC connection and a reconfiguration procedure.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or may be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations may be made therein without departing from the spirit and scope of the invention. Thus, it is intended that the present invention covers the modifications and variations of this invention that come within the scope of the appended claims and their equivalents.

What is claimed is:

1. A method for performing data switching between a plurality of communication systems by a user equipment, the method comprising:
   receiving a message for commanding data switching to a second communication system from a base station of a first communication system, at least one data radio bearer (DRB) being configured between the base station of the first communication system and the user equipment;
   performing an operation of the data switching to the second communication system based on the message;
   when the message instructs the user equipment to maintain a specific DRB of the at least one DRB after entering RRC idle mode, performing data communication with a base station of the second communication system while maintaining the specific DRB after entering RRC idle mode; and
   when the message instructs the user equipment to release the specific DRB after entering RRC idle mode, performing data communication with the base station of the second communication system after releasing the specific DRB,
   wherein the specific DRB comprises a default DRB or a dedicated DRB, and
   wherein the first communication system corresponds to a cellular communication system and wherein the second communication system corresponds to a wireless LAN communication system.

2. The method of claim 1, further comprising:
   if the data switching is performed between a plurality of the communication systems, negotiating with an entity of the first communication system whether to use a DRB information maintenance indication function.

3. The method of claim 2, wherein the entity of the first communication system corresponds to a base station, a mobility management entity (MME), or an interworking entity (IWE) managing interworking of a plurality of communication systems.

4. The method of claim 1, further comprising:
when the message instructs the user equipment maintains the specific DRB:
receiving a message from the base station of the first communication for commanding data switching to the first communication system; and
performing the data communication with the base station of the first communication system using the specific DRB without performing radio resource control (RRC) connection establishment or RRC reconnection establishment with the base station of the first communication system based on the message.

5. A user equipment for performing data switching between a plurality of communication systems, the user equipment comprising:
a receiver configured to receive a message for commanding data switching to a second communication system from a base station of a first communication system, at least one data radio bearers (DRB) being configured between the base station of the first communication system and the user equipment; and
a processor configured to:
perform an operation of the data switching to the second communication system based on the message; and
when the message instructs the user equipment to maintain a specific DRB of the at least one DRB after entering RRC idle mode, perform data communication with a base station of the second communication system while maintaining the specific DRB after entering RRC idle mode; and,
when the message instructs the user equipment to release the specific DRB after entering RRC idle mode, perform data communication with the base station of the second communication system after releasing the specific DRB,
wherein the specific DRB comprises a default DRB or a dedicated DRB, and
wherein the first communication system corresponds to a cellular communication system and wherein the second communication system corresponds to a wireless LAN communication system.

6. The user equipment of claim 5, wherein, when the message instructs the user equipment maintains the specific DRB:
the receiver is configured to receive a message from the base station of the first communication for commanding data switching to the first communication system; and
the processor is configured to perform the data communication with the base station of the first communication system using the specific DRB without performing radio resource control (RRC) connection establishment or RRC reconnection establishment with the base station of the first communication system based on the message.

* * * * *